US006813703B2

(12) United States Patent
Nishikawa et al.

(10) Patent No.: US 6,813,703 B2
(45) Date of Patent: Nov. 2, 2004

(54) EMULATION SYSTEM FOR DATA-DRIVEN PROCESSOR

(75) Inventors: Hiroaki Nishikawa, Tsukuba (JP);
Yasuhiro Wabiko, Tsukuba (JP);
Ryosuke Kurebayashi, Tsukuba (JP);
Shinya Ito, Tsukuba (JP)

(73) Assignee: Semiconductor Technology Academic Research Center, Yokohama (JP)

( * ) Notice: Subject to any disclaimer, the term of this patent is extended or adjusted under 35 U.S.C. 154(b) by 41 days.

(21) Appl. No.: 10/350,127

(22) Filed: Jan. 24, 2003

(65) Prior Publication Data

US 2003/0229485 A1 Dec. 11, 2003

(30) Foreign Application Priority Data

Jun. 7, 2002 (JP) ........................................ 2002-167439

(51) Int. Cl.[7] .............................................. G06F 9/455
(52) U.S. Cl. ............................ 712/25; 714/28; 712/220
(58) Field of Search ........................... 710/25; 711/167;
712/24, 25, 205, 206, 215, 220, 225, 246;
713/500, 502; 714/9, 10, 28

(56) References Cited

U.S. PATENT DOCUMENTS 6,065,106 A * 5/2000 Deao et al. .................... 712/24

6,678,817 B1 * 1/2004 Dua et al. .................... 712/205

FOREIGN PATENT DOCUMENTS

| EP | 459232 A2 | * | 12/1991 |
| EP | 618737 A2 | * | 10/1994 |
| GB | 2002553 A | * | 2/1979 |
| JP | 05002485 A | * | 1/1993 |

* cited by examiner

*Primary Examiner*—B. James Peikari
(74) *Attorney, Agent, or Firm*—Finnegan, Henderson, Farabow, Garrett & Dunner, L.L.P.

(57) ABSTRACT

An emulation system for data-driven processors aims at shortening the emulation time by employing parallel processing techniques without increasing overhead. The emulation system emulates virtual data-driven processors by using real data-driven processors. The emulation is performed by dividing the functionality of the processor into a data path and a timing path. In the data path emulation, each virtual packet to be processed in the virtual processor is expressed as a PACKET message, and the processing operation of the virtual packet is evaluated for each functional block. In the timing path emulation, a SEND signal and an ACK signal, to be controlled by a self-timed transfer control mechanism and a gate logic, are expressed as a SEND message and an ACK message, respectively, and stage-to-stage transfer operations of the SEND signal and the ACK signal are evaluated.

8 Claims, 37 Drawing Sheets

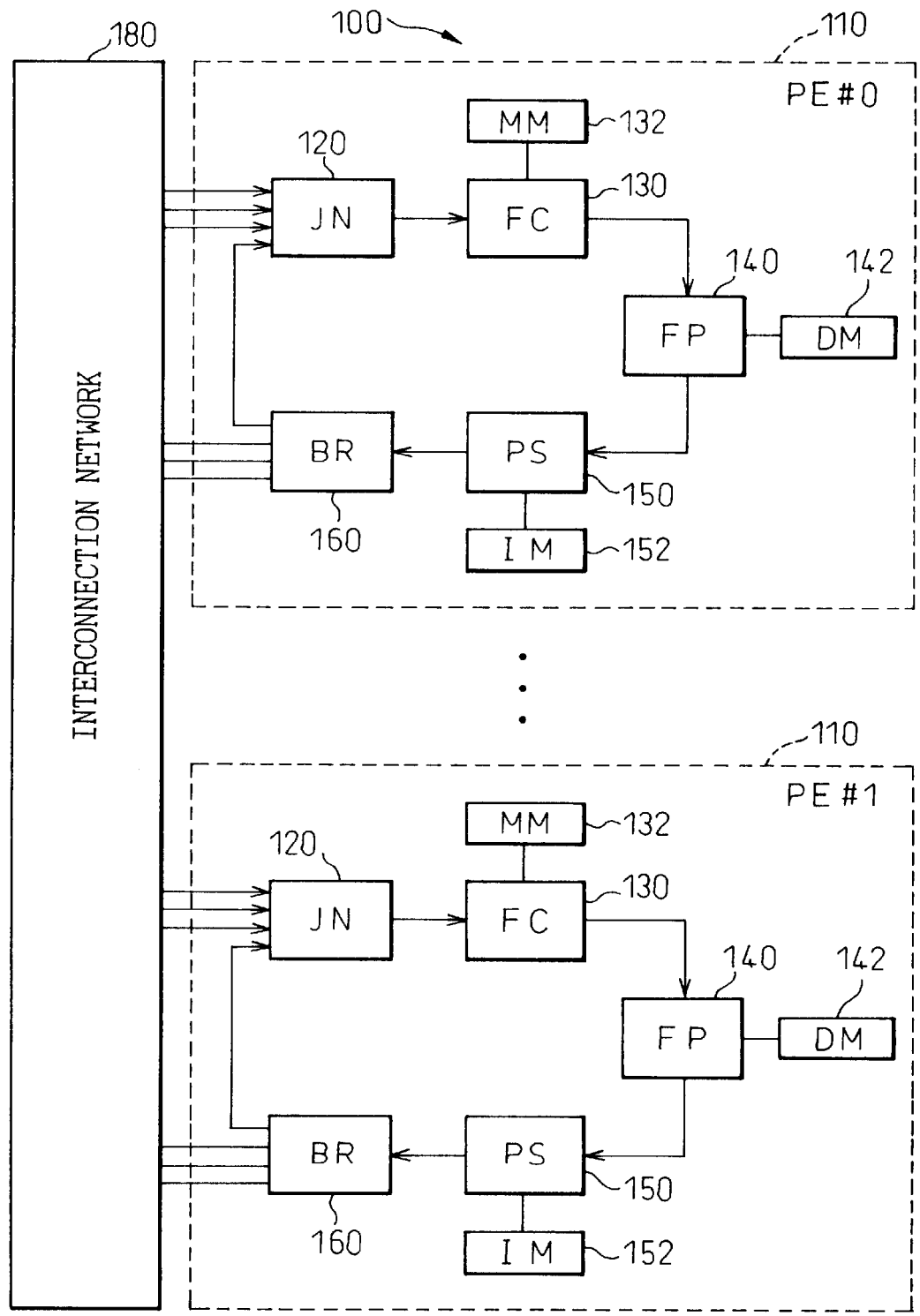

|  | INPUT STREAM | | | |
|---|---|---|---|---|
|  | w | x | y | z |
| GENERATION 1 | 2 | 3 | 4 | 5 |
| GENERATION 2 | 6 | 7 | 9 | 8 |

|        | TAG | | | | | |
|--------|-----|---|---|---|---|---|
|        | DESTINATION | | | | | |
| OP CODE | PE # | NODE # | PORT # | GENERATION | OPERAND |
| ADD | 0 | 0 | 0 | 1 | 2 |
| ADD | 0 | 0 | 1 | 1 | 3 |
| ADD | 0 | 0 | 0 | 2 | 6 |
| ADD | 0 | 0 | 1 | 2 | 7 |
| SUB | 1 | 1 | 0 | 1 | 4 |
| SUB | 1 | 1 | 1 | 1 | 5 |
| SUB | 1 | 1 | 0 | 2 | 9 |
| SUB | 1 | 1 | 1 | 2 | 8 |

Fig.3A
Fig.3B
Fig.3C
Fig.3D
Fig.3E
Fig.3F
Fig.3G
Fig.3H

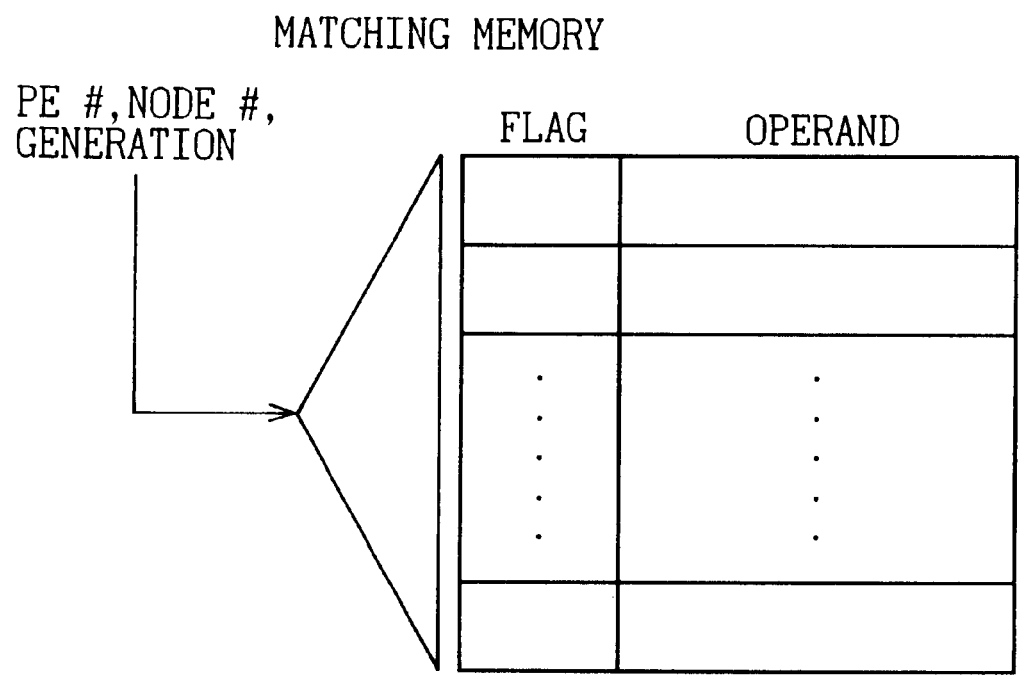

| OP CODE | NODE # | GENERATION | OPERAND 0 | OPERAND 1 | |
|---|---|---|---|---|---|
| ADD | 0 | 1 | 2 | 3 | Fig.5A |
| ADD | 0 | 2 | 6 | 7 | Fig.5B |
| SUB | 1 | 1 | 4 | 5 | Fig.5C |
| SUB | 1 | 2 | 9 | 8 | Fig.5D |

|        | NODE # | GENERATION | OPERAND |
|--------|--------|------------|---------|
| Fig.6A | 0      | 1          | 5       |
| Fig.6B | 0      | 2          | 13      |
| Fig.6C | 1      | 1          | −1      |
| Fig.6D | 1      | 2          | 1       |

INSTRUCTION MEMORY

| OP CODE | PE# | NODE # | PORT # | GENERATION | OPERAND |
|---|---|---|---|---|---|
| | | DESTINATION | | TAG | |
| MUL | 0 | 2 | 0 | 1 | 5 |

Fig.8A

| OP CODE | PE# | NODE # | PORT # | GENERATION | OPERAND |
|---|---|---|---|---|---|
| MUL | 0 | 2 | 0 | 2 | 13 |

Fig.8B

| OP CODE | PE# | NODE # | PORT # | GENERATION | OPERAND |
|---|---|---|---|---|---|
| MUL | 0 | 2 | 1 | 1 | −1 |

Fig.8C

| OP CODE | PE# | NODE # | PORT # | GENERATION | OPERAND |
|---|---|---|---|---|---|
| MUL | 0 | 2 | 1 | 2 | 1 |

Fig.8D

| SENDin | ACKin | SENDout | ACKout |
|--------|-------|---------|--------|
| 0 | 0 | 0 | 1 |
| 0 | 1 | HOLD | HOLD |
| 1 | 0 | HOLD | HOLD |
| 1 | 1 | 1 | 0 |

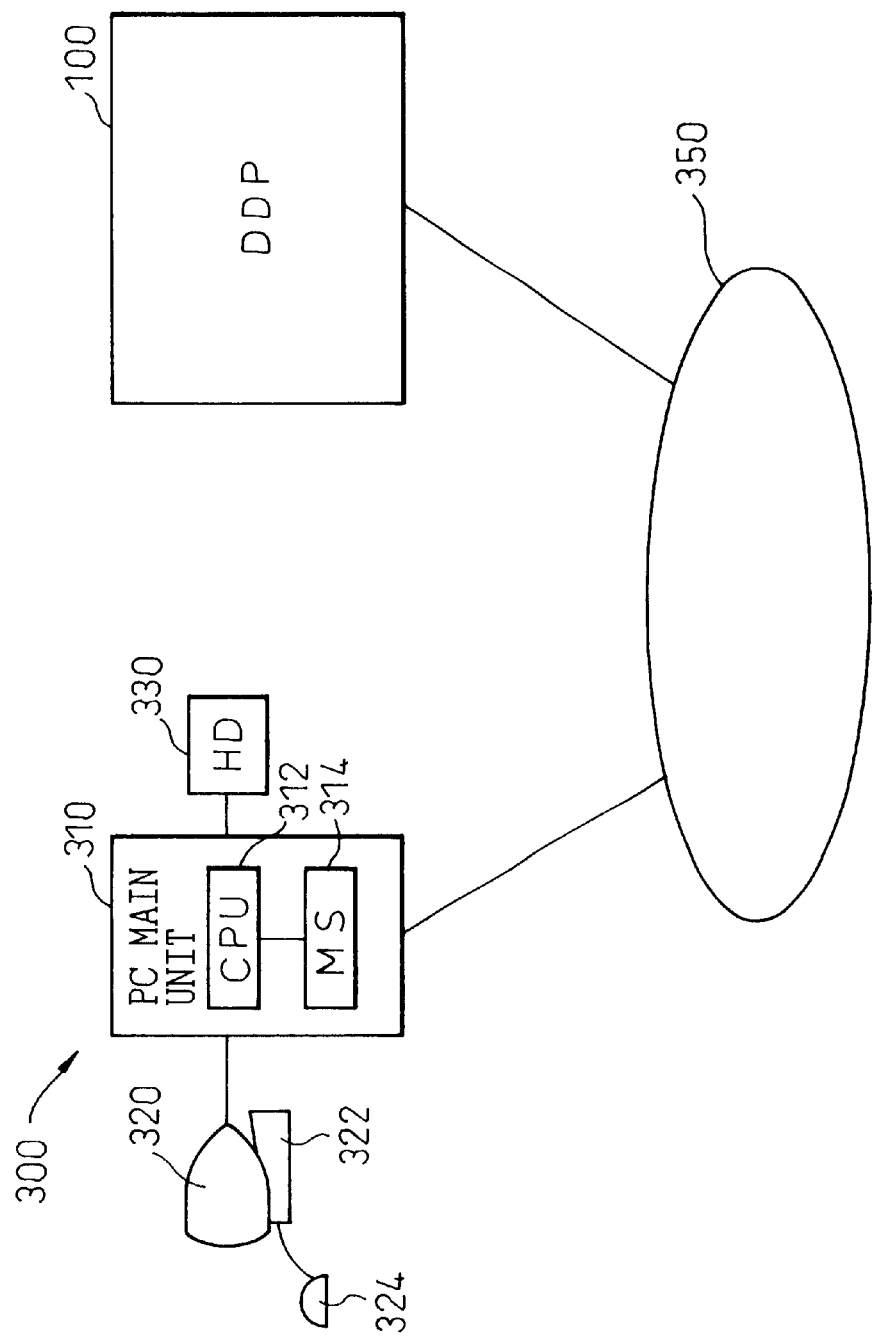

Fig.17

| IDf | SEND DELAY TIME | ACK DELAY TIME |
|---|---|---|
|  |  |  |
|  |  |  |
| ... | ... | ... |
|  |  |  |

Fig.19

| IDf | FORWARD IDf | BACKWARD IDf | FUNCTIONAL BLOCK IDf |
|---|---|---|---|
|  |  |  |  |
|  |  |  |  |
| ⋮ | ⋮ | ⋮ | ⋮ |
|  |  |  |  |

Fig.21

| IDp (PE #, NODE #, PORT #) | GENERATION | HASH KEY | MATCHING FLAG | OP CODE DELAY TIME | COPY # | NEXT IDp |
|---|---|---|---|---|---|---|
| . . . . . . . | . . . . . . . | . . . . . . . | . . . . . . . | . . . . . . . | . . . . . . . | . . . . . . . |

Fig.23

| IDf | IDp | | | TS |
|---|---|---|---|---|
| | DESTINATION PE # | DESTINATION NODE # | DESTINATION PORT # | |
| | | | | |
| ... | ... | ... | ... | ... |
| | | | | |

Fig.28

| TS | IDp | IDf | ABSORB FLAG |
|----|-----|-----|-------------|
|    |     |     |             |
|    |     |     |             |
| ⋮  | ⋮   | ⋮   | ⋮           |
|    |     |     |             |

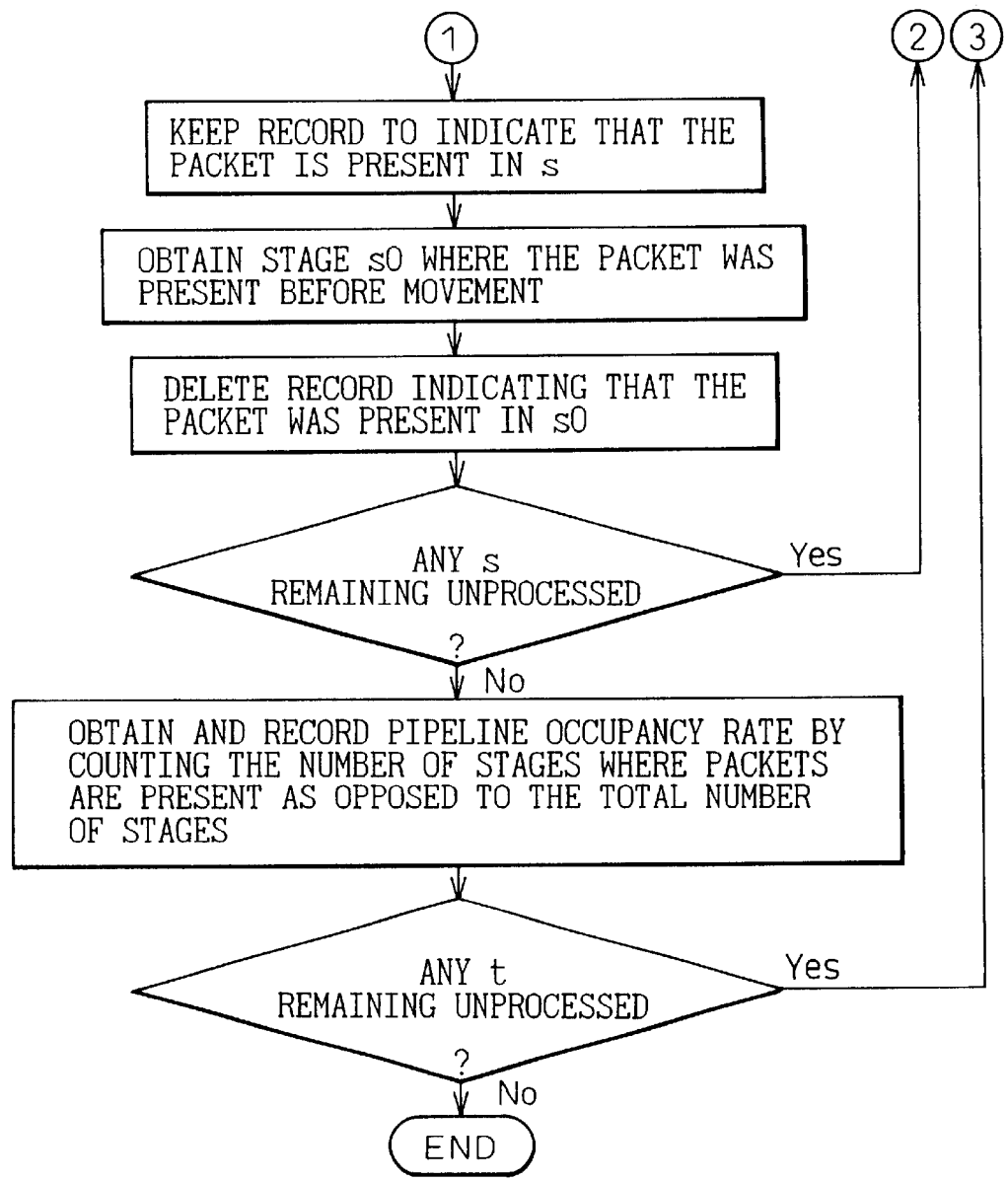

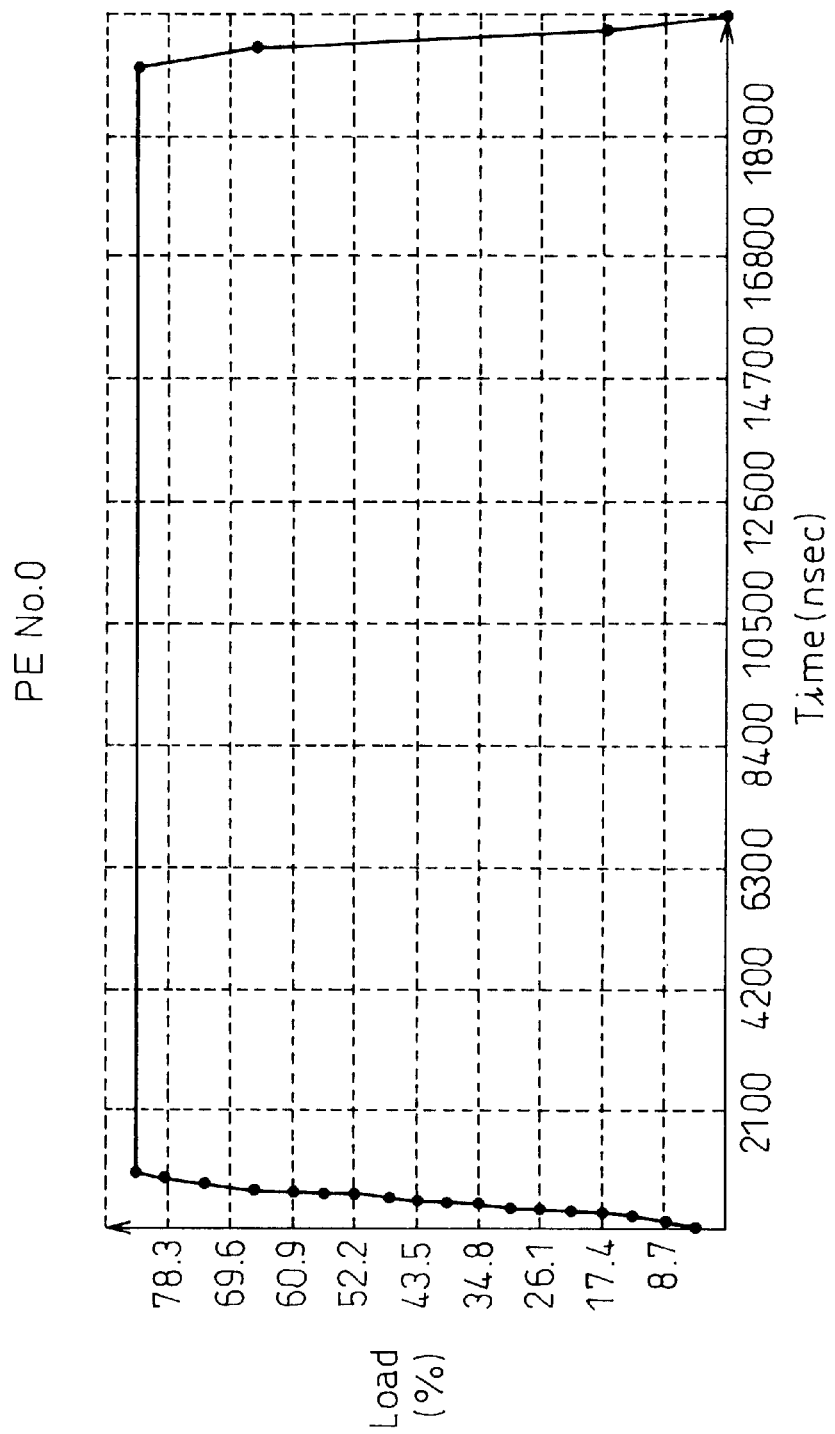

EMULATION SYSTEM FOR DATA-DRIVEN PROCESSOR

BACKGROUND OF THE INVENTION

1. Field of the Invention

The present invention relates to a system for emulating a data-driven processor.

2. Description of the Related Art

Research on parallel processing technologies has been proceeding in order to meet the need for higher computer speeds; among them, parallel computers have been important subjects of research. The majority of today's computers are von Neumann processors which fetch and execute instructions serially using a program counter. It is, however, difficult to obtain parallelism in a program for a von Neumann processor. In view of this, research into, and development of, data-driven processors has been carried out in various countries. A data-driven processor is one example of a non-von Neumann processor which executes a program written in the form of a dataflow graph, based on the data-driven concept that any instruction in a program is ready for execution when all the necessary data are available.

In an environment for supporting the development of a data-driven processor, there is a need to provide a system for emulating the operation of the targeted data-driven processor executing a target program. In accomplishing such emulation, it is important to boost the emulation speed by parallel processing. But the reality is that no proposals have ever been made regarding emulation techniques for evaluating pipelined modeling, etc. in a data-driven processor. In addition, an emulation system using a data-driven processor, having an excellent parallel processing capability, has not been proposed.

SUMMARY OF THE INVENTION

The present invention has been devised in view of the above problem, and an object of the invention is to provide an emulation system for data-driven processors, and more particularly, an emulation system that aims at shortening the emulation time by employing parallel processing techniques without increasing overhead.

To achieve the above object, according to a first aspect of the present invention, there is provided a data-driven processor emulation system which, using real data-driven processors, emulates virtual data-driven processors each organized as a pipeline consisting of a sequence of stages, each stage having a data latch for holding a packet, a logic circuit for processing the packet held in the data latch, a self-timed transfer control mechanism for supplying a synchronizing signal to the data latch, and an optional gate logic for controlling, based on processing results from the logic circuit, a SEND signal and an ACK signal transferred between the self-timed transfer control mechanism in the stage and a self-timed transfer control mechanism in a downstream stage, wherein each of the real data-driven processors comprises: data path emulation means for expressing a virtual packet, to be processed in the virtual data-driven processors, as a PACKET message which is a packet to be processed in the real data-driven processor, and for evaluating a processing operation of the virtual packet for each functional block within the virtual data-driven processors; and timing path emulation means for expressing the SEND signal and the ACK signal, to be controlled by the self-timed transfer control mechanism and the gate logic, as a SEND message and an ACK message, respectively, which are packets to be processed in the real data-driven processor, and for evaluating stage-to-stage transfer operation of the SEND signal and the ACK signal.

According to a second aspect of the present invention, the timing path emulation means in the system of the first aspect evaluates the position of the virtual packet at a given time by appending a timestamp to each of the SEND message and the ACK message.

According to a third aspect of the present invention, the timing path emulation means in the system of the first aspect evaluates control operation of the SEND signal and the ACK signal at the gate logic by receiving a CONTROL message representing the result of the evaluation from the data path emulation means.

According to a fourth aspect of the present invention, the data path emulation means in the system of the first aspect processes a plurality of PACKET messages in parallel by assigning a unique identifier to each virtual packet.

According to a fifth aspect of the present invention, the timing path emulation means in the system of the first aspect processes the SEND message and the ACK message in parallel by assigning a unique identifier to each stage.

According to a sixth aspect of the present invention, the system of the first aspect further comprises a von Neumann computer which is connected to the real data-driven processor via a computer network, and which performs processing for generating emulation information and displaying the result of the emulation.

According to a seventh aspect of the present invention, the von Neumann computer in the system of the sixth aspect creates in advance packet flow information concerning each individual virtual packet, and the data path emulation means determines the behavior of the virtual packet by referring to the packet flow information.

According to an eighth aspect of the present invention, the von Neumann computer in the system of the sixth aspect receives, from the real data-driven processor, trace information concerning the position and time of each virtual packet, and displays a pipeline occupancy graph plotting the ratio of the number of stages where packets are present to the total number of stages as a function of time.

BRIEF DESCRIPTION OF THE DRAWINGS

Further features and advantages of the present invention will be apparent from the following description with reference to the accompanying drawings, in which:

FIG. 1 is a block diagram showing, in simplified form, the configuration of a data-driven processor;

FIGS. 3A, 3B, 3C, 3D, 3E, 3F, 3G, and 3H are diagrams showing eight packets to be input in accordance with the input streams shown in FIG. 2B;

FIG. 4 is a diagram showing in simplified form the organization of a matching memory (MM) connected to a firing control (FC);

FIGS. 5A, 5B, 5C, and 5D are diagrams showing examples of packets transferred from the firing control (FC) to a functional processor (FP);

FIGS. 6A, 6B, 6C, and 6D are diagrams showing examples of packets transferred from the functional processor (FP) to a program storage (PS);

FIGS. 8A, 8B, 8C, and 8D are diagrams showing examples of packets transferred from the program storage (PS);

FIG. 13 is a block diagram showing one embodiment of a data-driven processor emulation system according to the present invention;

FIG. 17 is a diagram showing a table of SEND/ACK delay time information;

FIG. 19 is a diagram showing a table of pipeline configuration information;

FIG. 21 is a diagram showing a table of packet flow information;

FIG. 23 is a diagram showing a table of input stream information;

FIG. 28 is a diagram showing a table of output stream information;

FIGS. 35A and 35B is a flowchart illustrating a procedure for constructing a pipeline occupancy graph;

FIG. 37 is a diagram showing an example of the pipeline occupancy graph displayed on a display.

DESCRIPTION OF THE PREFERRED EMBODIMENTS

An embodiment of the present invention will be described below with reference to the accompanying drawings. First, a description will be given of the configuration and operation of a data-driven processor which is the target to be emulated according to the present invention, and which also constitutes one embodiment of the emulation system according to the present invention.

FIG. 1 is a block diagram showing in simplified form the configuration of the data-driven processor. As shown, the data-driven processor 100 comprises a plurality of PEs (Processing Elements) 110 and an interconnection network 180 interconnecting them.

Each PE 110 has a circular pipeline structure comprising five functional blocks consisting of a joint (JN) 120, a firing control (FC) 130, a functional processor (FP) 140, a program storage (PS) 150, and a branch (BR) 160. A matching memory (MM) 132 is connected to the firing control (FC) 130, while an instruction memory (IM) 152 is connected to the program storage (PS) 150. Further, an optional data memory (DM) 142 may be connected to the functional processor (FP) 140.

The operation will be described for the case where the data-driven processor 100 comprises two PEs, i.e., PE #0 and PE #1, and processes the dataflow program shown in FIG. 2A. The program of FIG. 2 shows an example of performing the operation (w+x)*(y+z), and it is assumed here that an input stream of w=2, x=3, y=4, and z=5 and an input stream of w=6, x=7, y=9, and z=8 are given to the program as generation 1 and generation 2, respectively, as shown in FIG. 2B.

Figures 2A, 2B:
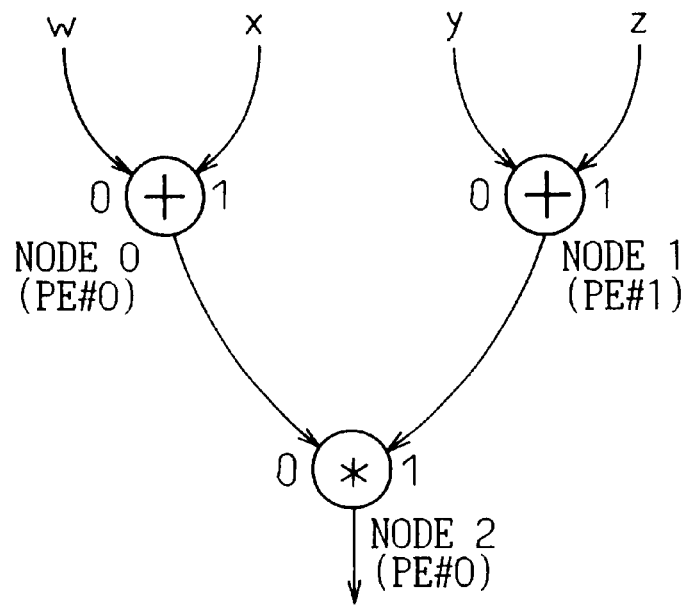
FIG. 2A is a diagram showing a dataflow program.
FIG. 2B is a diagram showing input streams to be input to the program.

The program of FIG. 2A has three nodes consisting of node 0, node 1, and node 2; here, the convention is used that the operations at node 0 and node 2 are performed by PE #0 and the operation at node 1 by PE #1. Further, as shown in FIG. 2A, the input w is fed to port 0 of node 0, the input x to port 1 of node 0, the input y to port 0 of node 1, and the input z to port 1 of node 1, respectively.

In the execution of the program, eight packets shown in FIGS. 3A to 3H are input to the data-driven processor in accordance with the input streams shown in FIG. 2B. As shown, each input packet contains an op code, a tag, and an operand, and the tag is made up of destination and generation. The destination is made up of PE #, node #, and port #.

Of the packets input to the data-driven processor, the four packets shown in FIGS. 3A to 3D, which carry "0" as the destination PE # value, are sent to the firing control (FC) 130 in the PE #0 via the joint (JN) 120 in the PE #0. When a packet arrives at the firing control (FC) 130, the firing control (FC) 130 refers to the matching memory (MM) 132.

Of the two operands to be used in one operation, the operand that arrived first is stored in the matching memory (MM) 132, which is referred to by using the PE #, node #, and generation as the address, as shown in FIG. 4. Flag indicates whether the operand is already stored or not. In the present embodiment, the capacity of the matching memory is reduced by employing a hash method.

When the packet of FIG. 3A arrives at the firing control (FC) 130 in the PE #0, for example, if an operand having the same PE #, node #, and generation as the PE #, node #, and generation of the arriving packet is not yet stored, the operand carried in the packet of FIG. 3A is stored, and the flag is set to 1. At this point, the packet of FIG. 3A is discarded.

Thereafter, when the packet of FIG. 3B, which has the same PE #, node #, and generation as the PE #, node #, and generation of the packet of FIG. 3A, arrives at the firing control (FC) 130 in the PE #0, the already stored operand is read out, and a packet carrying the two operands as shown in FIG. 5A is generated and sent to the functional processor (FP) 140.

Likewise, the firing control (FC) 130 in the PE #0 generates the packet shown in FIG. 5B from the two packets of FIGS. 3C and 3D and sends it to the functional processor (FP) 140 in the PE #0. On the other hand, the firing control (FC) 130 in the PE #1 generates the packet shown in FIG. 5C from the two packets of FIGS. 3E and 3F and the packet shown in FIG. 5D from the two packets of FIGS. 3G and 3H, and sends the respective packets to the functional processor (FP) 140 in the PE #1.

When the packet shown in FIG. 5A is sent to the functional processor (FP) 140 in the PE #0, the functional processor (FP) 140 performs the operation specified by the op code ADD, and sends the packet of FIG. 6A, with the result of the operation included as an operand, to the program storage (PS) 150 in the PE #0. Likewise, when the packet of FIG. 5B arrives, the functional processor (FP) 140 in the PE #0 sends the packet of FIG. 6B to the program storage (PS) 150 in the PE #0. On the other hand, the functional processor (FP) 140 in the PE #1 sends to the program storage (PS) 150 in the PE #1 the packet of FIG. 6C in response to the packet of FIG. 5C and the packet of FIG. 6D in response to the packet of FIG. 6D, respectively.

Figure 7:
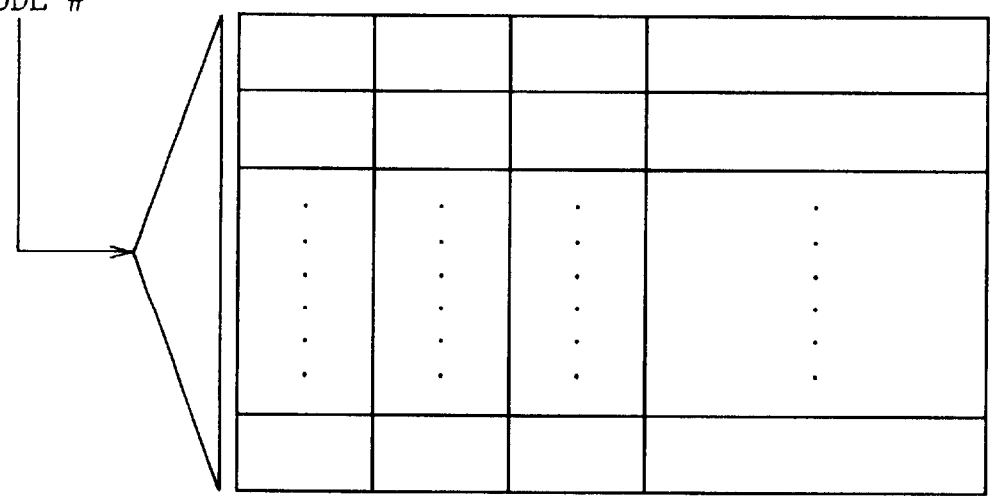
FIG. 7 is a diagram showing in simplified form the organization of an instruction memory (IM) connected to the program storage (PS)

When the packet sent from the functional processor (FP) 140 arrives at the program storage (PS) 150, the program storage (PS) 150 refers to the instruction memory (IM) 152. As shown in FIG. 7, the instruction memory (IM) 152 is a memory in which PE #, node #, port #, and op code specifying a new instruction are stored in association with the node #. For example, when the packet of FIG. 6A arrives at the program storage (PS) 150 in the PE #0, the packet shown in FIG. 8A is generated in accordance with the contents of the instruction memory (IM) 152. The generated packet is sent via the branch (BR) 160 to the PE specified by the destination value.

Likewise, the program storage (PS) 150 in the PE #0 generates the packet of FIG. 8B in response to the packet of FIG. 6B. On the other hand, the program storage (PS) 150 in the PE #1 generates the packet of FIG. 8C in response to the packet of FIG. 6C and the packet of FIG. 8D in response to the packet of FIG. 6D.

In this way, in the program storage (PS) 150, a new packet is generated as each arriving packet is discarded. Depending on the number of output ports of the node, more than one packet may be generated or a new packet may not be generated. The same processing as described above is applied to the packets shown in FIGS. 8A to 8D. The processing of the dataflow program shown in FIG. 2A is thus completed.

Figure 9:
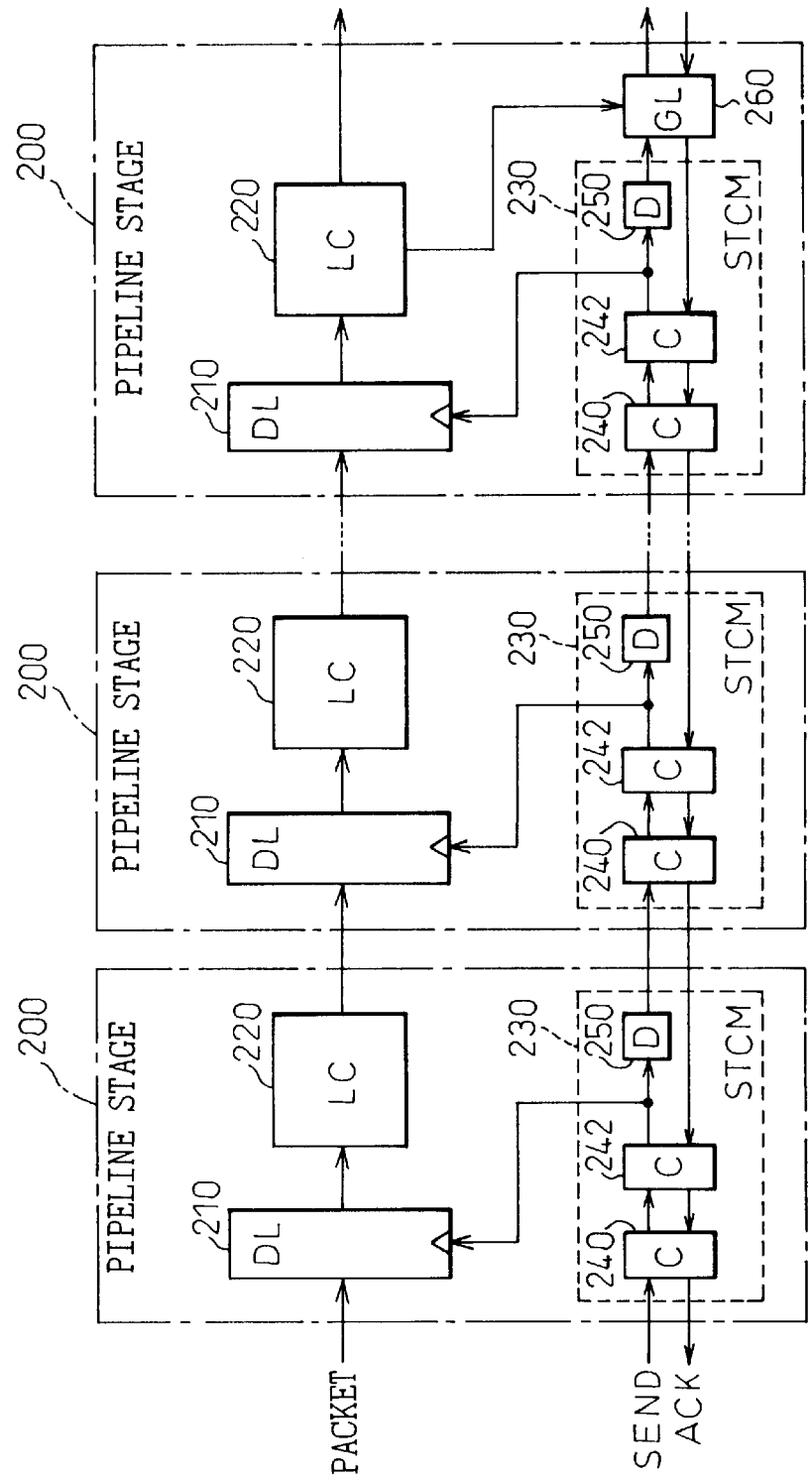
FIG. 9 is a diagram showing a pipeline structure of each functional block in PE.

The PE 110 has a superpipeline structure based on a self-timed elastic pipeline. FIG. 9 is a diagram showing the configuration of each of the functional blocks, i.e., the joint (JN) 120, the firing control (FC) 130, the functional processor (FP) 140, the program storage (PS) 150, and the branch (BR) 160 in the PE 110.

As shown, each functional block comprises a plurality of pipeline stages 200. Each pipeline stage 200 comprises a data latch (DL) 210 for latching a packet, a combinational logic circuit (LC) 220 for processing the latched packet, and a self-timed transfer control mechanism (STCM) 230 for supplying a synchronizing signal, i.e., a clock (trigger) signal, to the data latch. In the elastic pipeline, as the clock line to the data latch is minimized, clock skew, which is a major barrier to speedup, can be minimized and, at the same time, the area affected by partial customization can also be minimized.

Further, in a pipeline stage where the packet flow varies depending on the result of the evaluation from the logic circuit 220, such as packet discard due to matching at FC or packet discard and generation at PS, there is provided a gate logic (GL) 260 to control the SEND/ACK signals described hereinafter.

The self-timed transfer control mechanism (STCM) 230, which achieves the elastic pipeline, autonomously determines the packet transfer timing, based only on the available state of the neighboring stage(s), and generates a local clock signal. The self-timed transfer control mechanism (STCM) 230 comprises two C elements (Coincidence Elements) 240 and a delay element 250 for guaranteeing the packet processing time in the logic circuit (LC) 220.

Figures 10A, 10B:
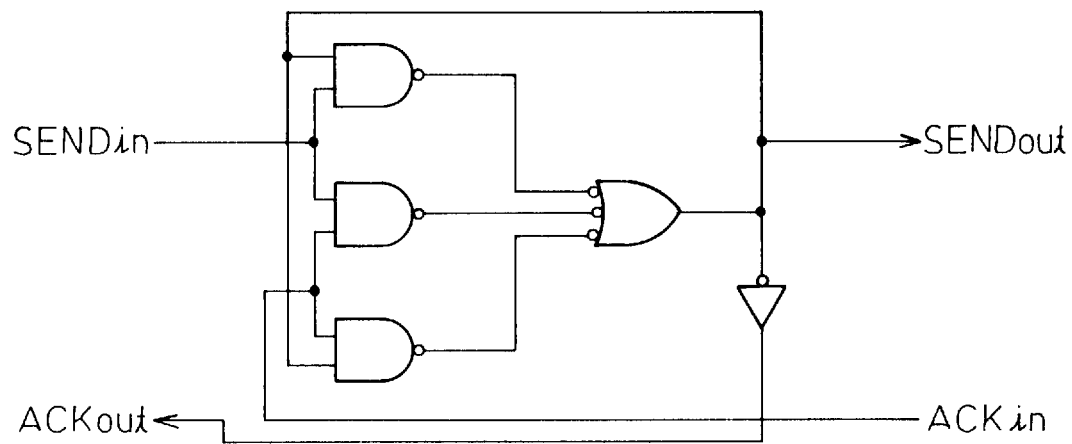
FIG. 10A is a diagram illustrating a circuit diagram of a C element.
FIG. 10B is a diagram showing a truth table for the same.

The C elements are provided to perform a handshake between the transmit signal SEND and the acknowledge signal ACK. FIG. 10A illustrates a circuit diagram of each C element, and FIG. 10B is a truth table for the same. As can be seen, the C element is a flip-flop such that, when the input SENDin from the upstream side (the preceding stage) and the input ACKin from the downstream side (the succeeding stage) are both 1, the output SENDout to the downstream side is set to 1 and the output ACKout to the upstream side to 0, while when the input SENDin from the upstream side and the input ACKin from the downstream side are both 0, the output SENDout to the downstream side is set to 0 and the output ACKout to the upstream side to 1.

The reason that the self-timed transfer control mechanism (STCM) 230 comprises two C elements forming two stages of flip-flops is to enhance the buffering efficiency by enabling different packets to be stored in succession in the respective data latches (DL) 210. Here, all the C elements are reset by a master reset signal (not shown) to the initial state, that is, the output SEND=0 and the output ACK=1.

As the self-timed transfer control mechanism (STCM) 230 comprises the two C elements 240 and 242 and the SEND signal delay element 250, as described above, when the STCM 230 is regarded as one handshake device, the output SEND to the downstream side and the output ACK to the upstream side are respectively set active when respectively different times have elapsed from the time the handshake was established.

Figure 11:
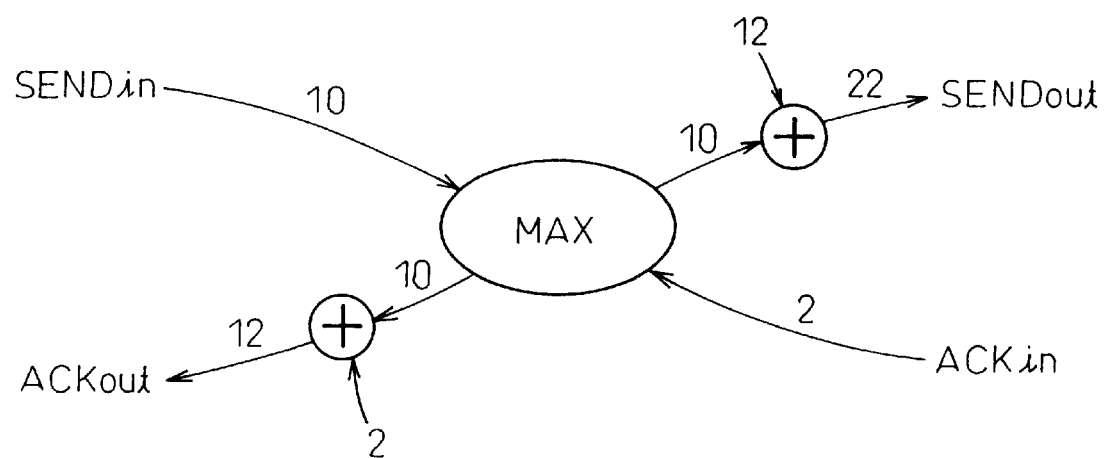
FIG. 11 is a diagram schematically showing in the form of a dataflow graph the timing at which a self-timed transfer control mechanism (STCM) transfers a SEND signal and an ACK signal.

The timing at which the self-timed transfer control mechanism (STCM) 230 transfers the SEND signal and the ACK signal can be schematically shown in the form of a dataflow graph, for example, as shown in FIG. 11. In the illustrated example, after ACK arrived at time 2, SEND arrives at time 10 and a handshake is established; here, a delay of 12 occurs in SEND, and SEND is transferred at time 22, while a delay of 2 occurs in ACK, and ACK is transferred at time 12. In this way, the SEND delay time and the ACK delay time in the self-timed transfer control mechanism (STCM) 230 are determined for each stage.

Figure 12A:
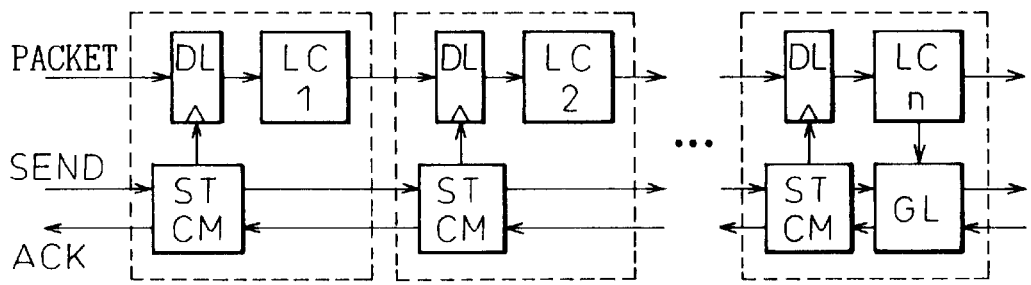
FIGS. 12A, 12B, and 12C are diagrams for explaining an elastic pipeline evaluation model.
Figure 12B:
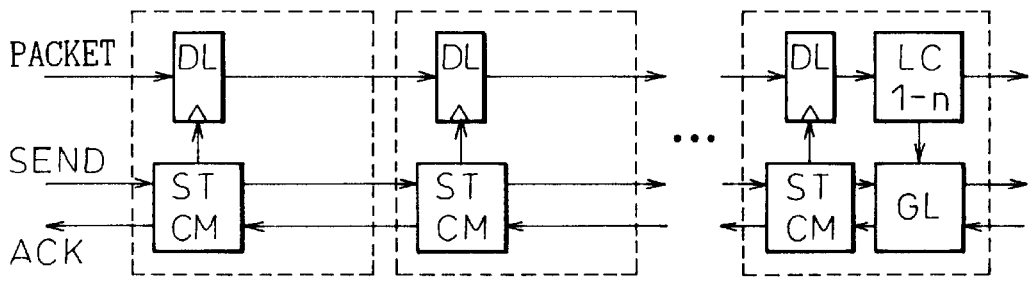
Figure 12C:
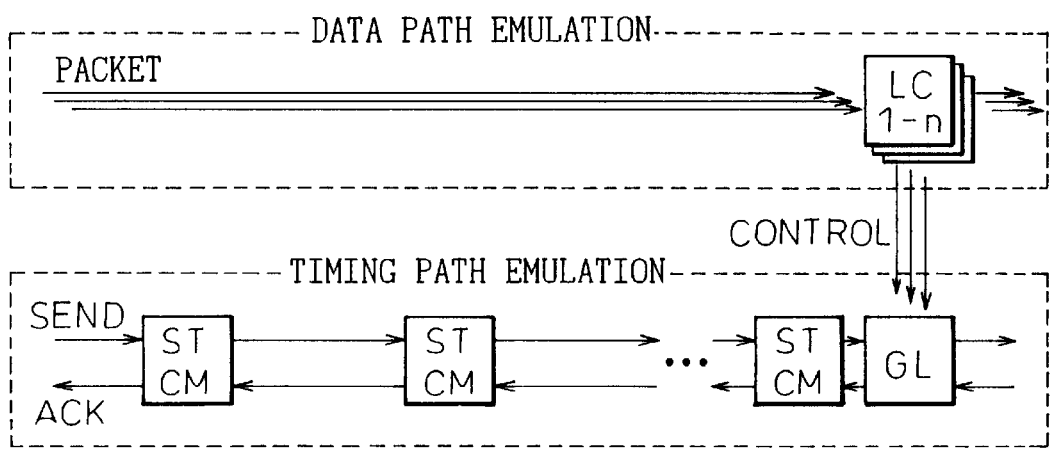

The emulation according to the present invention will be described below. FIGS. 12A to 12C are diagrams for explaining an elastic pipeline evaluation model. The most direct method for emulating the elastic pipeline is to model each individual pipeline stage as an autonomous module that communicates SEND/ACK/PACKET messages to each other. In this model, the packet transfer timing can be determined if only the arrival times of the SEND/ACK messages to the module are known. Accordingly, by appending a timestamp to each of the SEND/ACK messages, the packet position at a given time can be evaluated.

At this time, the emulation of the functional block operation, that is, the referencing and updating of the PACKET message, need not be performed individually for each module, as long as the SEND/ACK messages can be controlled by the gate logic (GL). That is, the construction of the model can be made easier if provisions are made to evaluate the PACKET message only in the module that handles the gate logic (GL), as shown in FIG. 12B. In the model of FIG. 12B, however, it is apparent that the module that handles the gate logic (GL) becomes a bottleneck in the pipeline, which degrades the evaluation efficiency of the entire pipeline. These conflicting issues must be solved.

In view of this, in the emulation method of the present invention, it is noted that the elastic pipeline can be divided into two communication paths: the PACKET communication path (hereinafter called the data path) connecting the data latches, and the SEND/ACK signal communication path (hereinafter called the timing path) comprising the transfer control mechanisms (STCMS) and the gate logic (GL). When viewed from the data path, the timing path corresponds to a clock generator in a synchronous pipeline. This means that, basically, the data path only receives a clock input from the timing path.

As an exception, at the gate logic (GL), the data path controls the timing path, but if only the packet transfer to and from the gate logic is considered, the timing path can be processed independently of the data path. Accordingly, the data path and the timing path are modeled with different levels of granularity, and the two paths are evaluated in parallel as far as possible. The data path evaluation is referred to as the functional block emulation (or data path emulation) and the timing path evaluation as the pipeline emulation (or timing path emulation) according to the modeling granularity.

In the emulation method of the present invention, the PACKET message is evaluated by each functional block in the functional block emulation, and the SEND/ACK messages are appropriately controlled by sending the result as a CONTROL message to the gate logic (GL) in the functional block emulation. In this method, the functional block emulation can be evaluated ahead of the pipeline emulation and, as the structure of the pipeline emulation is uniform, the pipeline processing efficiency can be enhanced.

Further, it is required that, within the module in the functional block emulation, the plurality of packets be evaluated in parallel and that the CONTROL message appropriate to each SEND message be selected at the gate logic in the pipeline emulation. These requirements can be accomplished by multiprocessing that makes use of generations as "colors" in a dynamic data-driven system.

In the emulation method of the present invention, the SEND/ACK/PACKET/CONTROL messages are expressed as packets on the data-driven processor as a real machine. To perform parallel processing in the data-driven processor without mutual interference, a unique generation should be given to each context. In this case, between the pipeline emulation and the functional emulation that differ in nature, the generation should be given by using different methods. All virtual modules, including the transfer control mechanism and the gate logic between pipeline stages, are each preassigned a unique identifier IDf. In the present embodiment, IDf is made up of a field indicating PE #, a field indicating the functional block, and a field indicating the stage (to identify LC and GL as well as STCM).

In the functional block emulation (data path emulation), as a plurality of PACKET messages are evaluated concurrently in one virtual module, each PACKET message should be made to belong to a different context. Therefore, a unique identifier IDp is assigned to the virtual packet expressing each PACKET message. In the present embodiment, IDp is made up of a field indicating the destination PE #, a field indicating the destination node #, and a field indicating the destination port #. IDp is updated when evaluating the PS.

In the pipeline emulation (timing path emulation), as no more than one packet is present in each pipeline stage, all the messages can be evaluated in parallel by assigning a generation that differs from stage to stage. Accordingly, IDf is taken as the generation, and the time and date of the message generation is recorded as a timestamp in the packet data. Further, for synchronization between the SEND message and the CONTROL message at the gate logic (GL), an identifier IDm is temporarily assigned to achieve packet matching.

In the present embodiment, the ACK message carries IDf as the generation and TS as the operand. The SEND message carries IDf as the generation and IDp, IDm, and TS as the operand. The PACKET message carries IDf and IDm as the generation and IDp as the operand. The CONTROL message carries IDm as the generation and control data as the operand.

In the functional block emulation (data bus emulation), packet discard due to matching (FC), generation of a new packet by data copy (PS), and packet branching dependent on the operation result and the stored instruction (FP, PS, BR) are determined, and the result is reported in the form of a CONTROL message to the gate logic (GL). Basically, these behaviors are determined at the respective functional blocks based on the PACKET message and the memory contents unique to each functional block.

However, as all information necessary for instruction execution is self-sufficient within each packet, the behavior of each packet can be evaluated by preprocessing, regardless of its dynamic positional relationship with other packets. That is, by performing preprocessing as far as possible, the evaluation efficiency of the functional block emulation can be increased. Therefore, in the present embodiment, information necessary for the emulation is obtained as packet flow information before performing the emulation, as will be described later, and the emulation program for each functional block determines the behavior of the packet being evaluated, by referring to the packet flow information based on the IDp of that packet.

FIG. 13 shows one embodiment of an emulation system implementing the above emulation method. As shown, the emulation system comprises data-driven processors 100 which operate as an emulator by executing an emulation program, a personal computer (PC) 300 which performs processing to generate emulation information and display the result of the emulation, and a computer network 350 interconnecting them. The PC 300 is an ordinary personal computer, that is, a von Neumann computer, and comprises a PC main unit 310 having a central processing unit (CPU) 312 and a main storage (MS) 314, a display 320, a keyboard 322, a mouse 324, and a hard disk unit 330 as an external storage.

Figure 14:
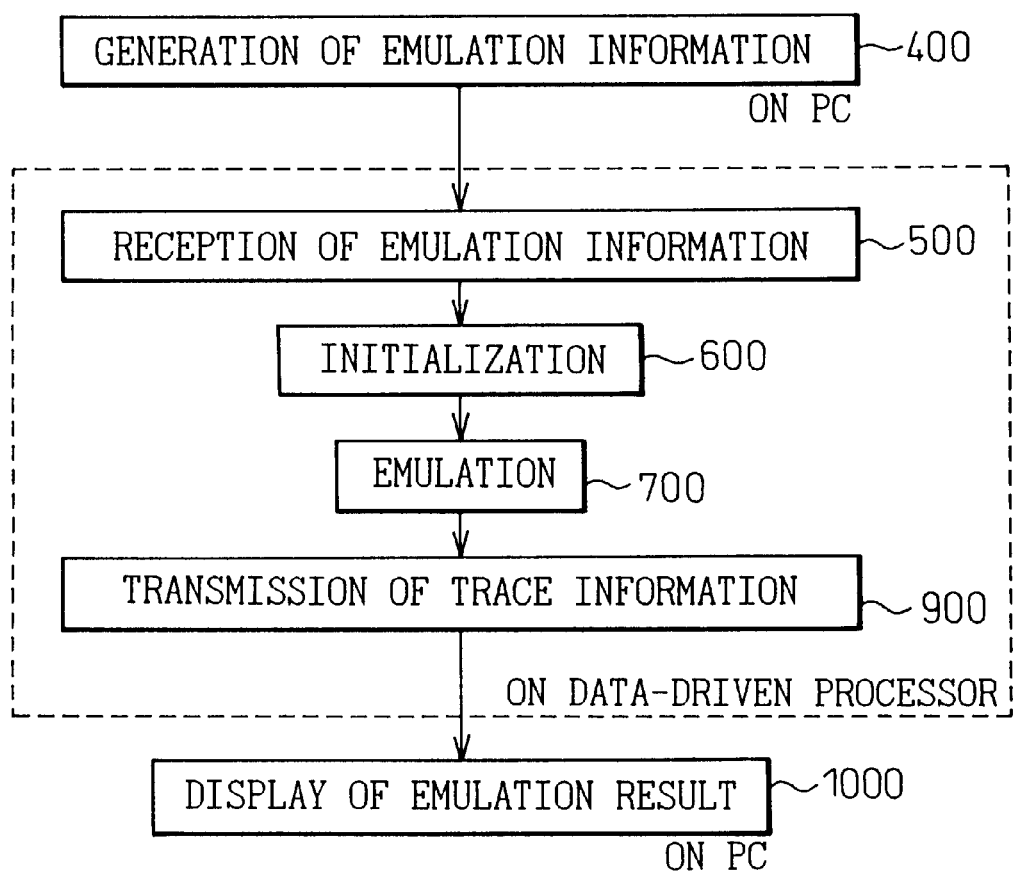
FIG. 14 is a diagram outlining the entire operation process of the emulation system.

FIG. 14 illustrates the entire operation process of the emulation system shown in FIG. 13. As shown, first the PC 300 generates the emulation information and transmits it to the data-driven processors 100 (step 400). Next, the data-driven processors 100 receive the emulation information and convert it into a prescribed format (step 500), perform a prescribed initialization procedure (step 600), execute the emulation (step 700), and transmit the resulting trace information to the PC 300 after converting the format (step 900). The PC 300 receives the trace information and displays the result of the emulation on the display (step 1000). The details of the above processes will be described below.

Figure 15:
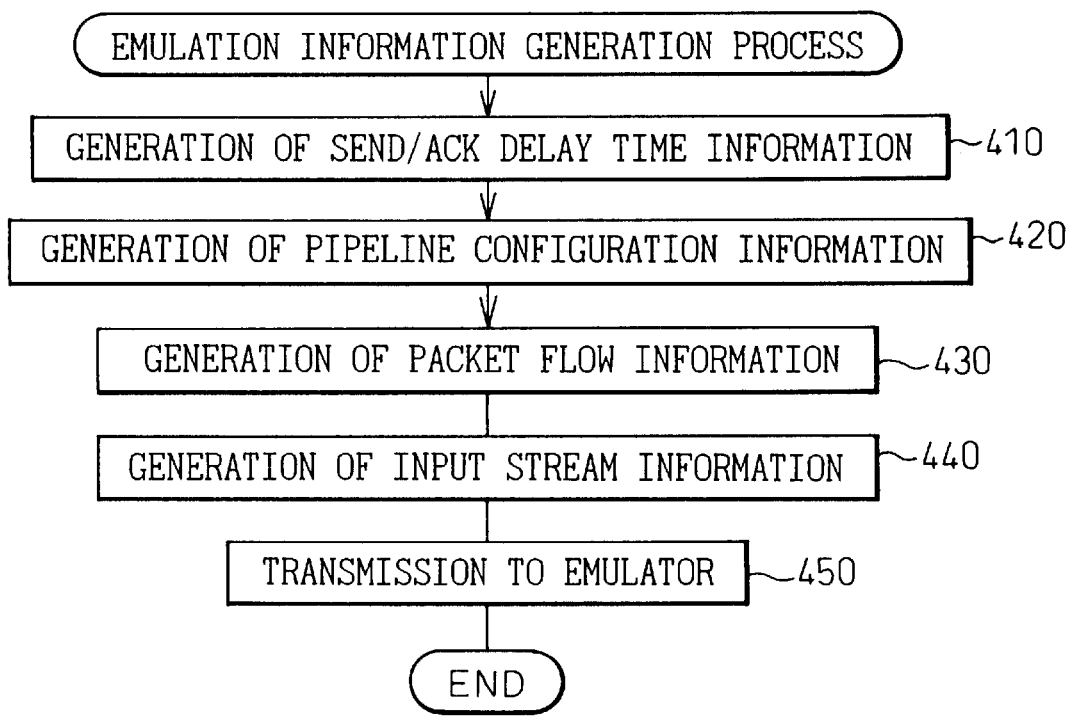
FIG. 15 is a flowchart illustrating a procedure for the emulation information generation process performed in a personal computer (PC)
Figure 16:
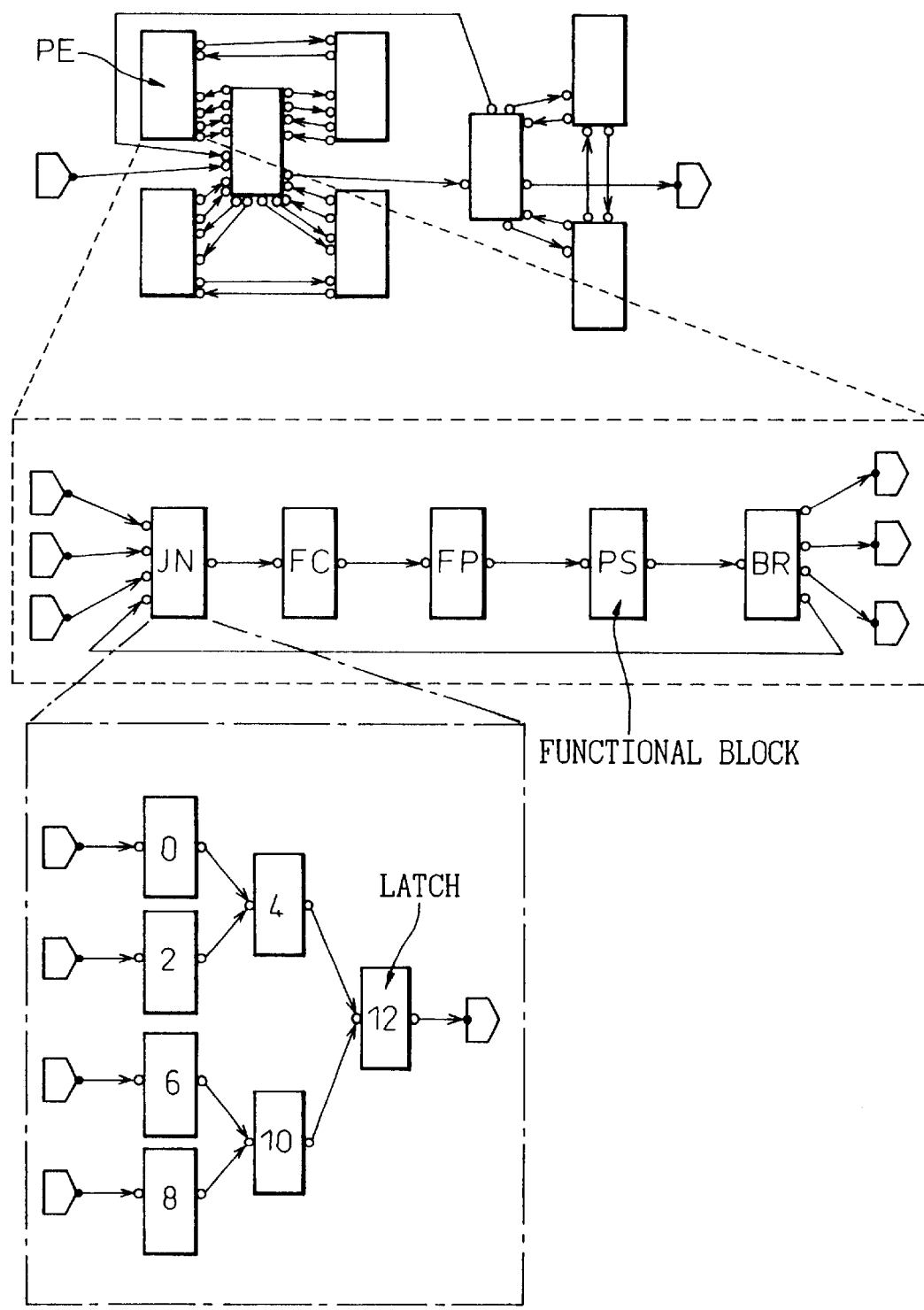
FIG. 16 is a diagram for explaining how the pipeline structure of the data-driven processor to be emulated is input on the PC.

FIG. 15 is a flowchart illustrating a procedure for the emulation information generation process (step 400 in FIG. 14) performed in the PC 300. Using a GUI (Graphical User Interface), the user inputs a dataflow program and an input stream, such as shown in FIGS. 2A and 2B, and the pipeline structure of the data-driven processor to be emulated, such as shown in FIG. 16. In the emulation information generation process, the following processing is performed based on the input data.

Figure 17:
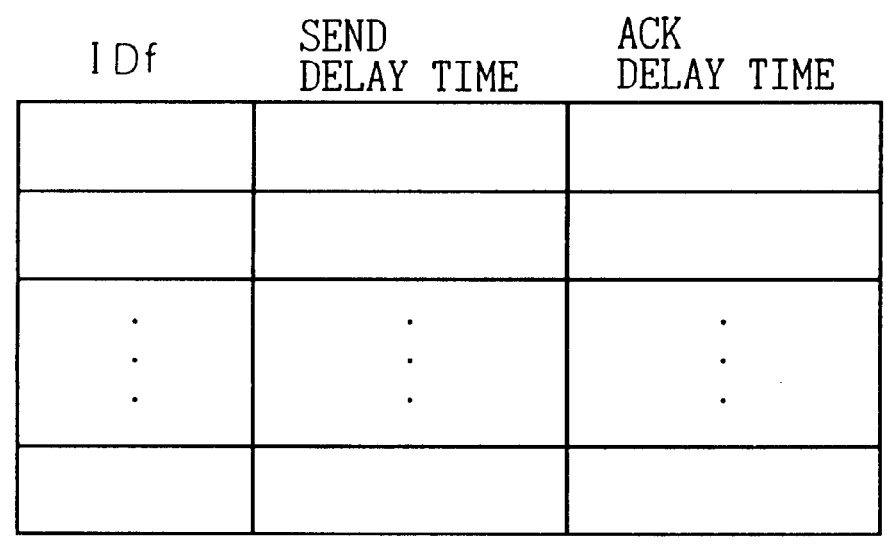
Figure 18:
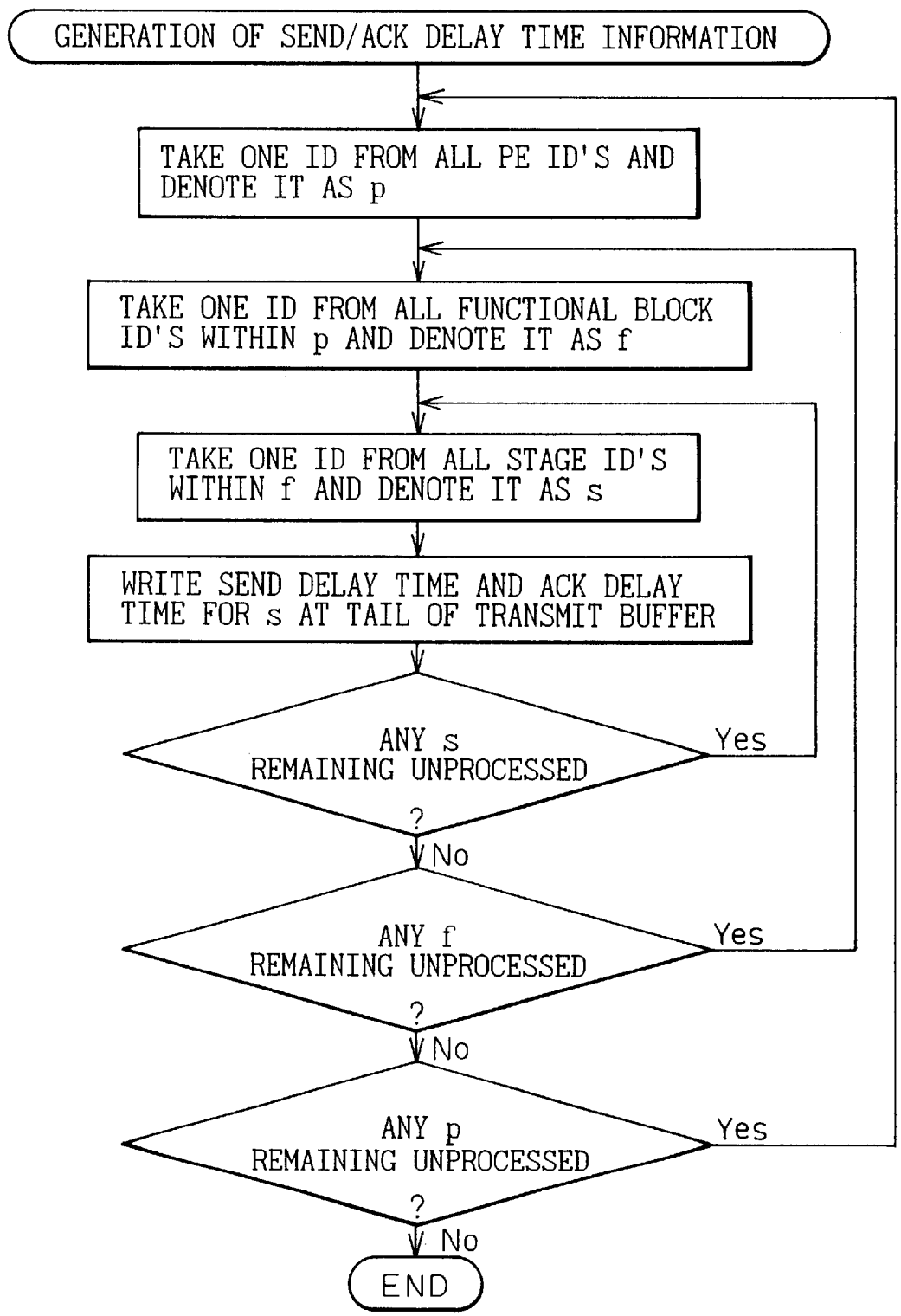
FIG. 18 is a flowchart illustrating a procedure for the generation of the SEND/ACK delay time information.

First, in step 410, the SEND/ACK delay time information shown in FIG. 17 is generated. The SEND delay time and the ACK delay time have previously been described with reference to FIG. 11, and are set for each pipeline stage, that is, are based on IDf. The detailed procedure for the generation of this information is shown in the flowchart of FIG. 18.

Figure 20:
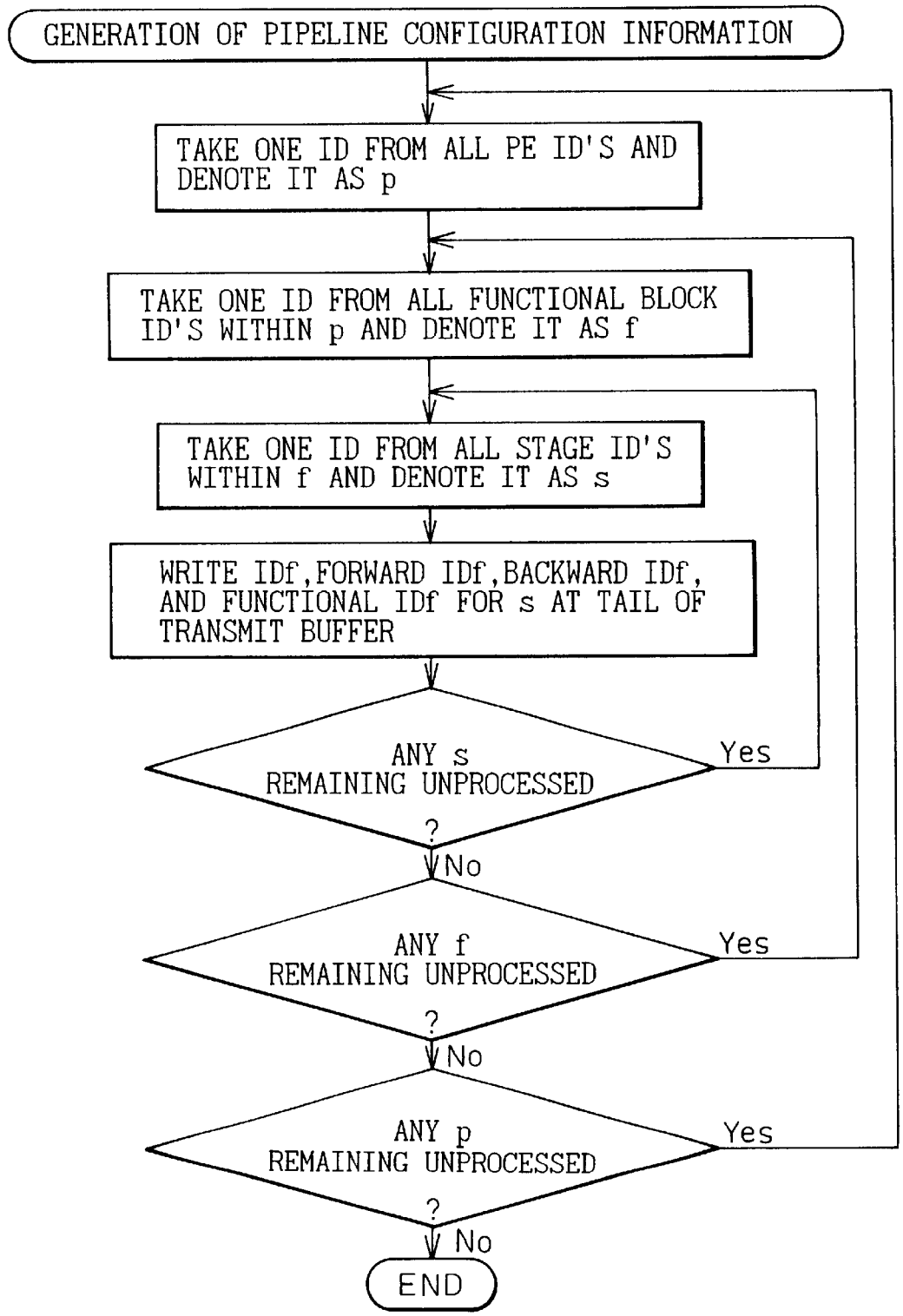
FIG. 20 is a flowchart illustrating a procedure for the generation of the pipeline configuration information.

Next, in step 420, the pipeline configuration information shown in FIG. 19 is generated. The pipeline configuration information defines that the module specified by IDf transmits the SEND message to the forward IDf, the ACK message to the backward IDf, and the PACKET message to the functional block IDf. The detailed procedure for the generation of this information is shown in the flowchart of FIG. 20.

Next, in step 430, the packet flow information shown in FIG. 21 is generated. The packet flow information is information concerning each individual packet and obtained in advance in order to increase the efficiency of the functional block emulation. Each functional block in the functional block emulation refers to the packet flow information based on the IDp of the packet to be evaluated, and thereby evaluates the behavior of the packet. In the present embodiment, IDp is expressed using the destination PE #, destination node #, and destination port #, as previously described.

Figure 22A:
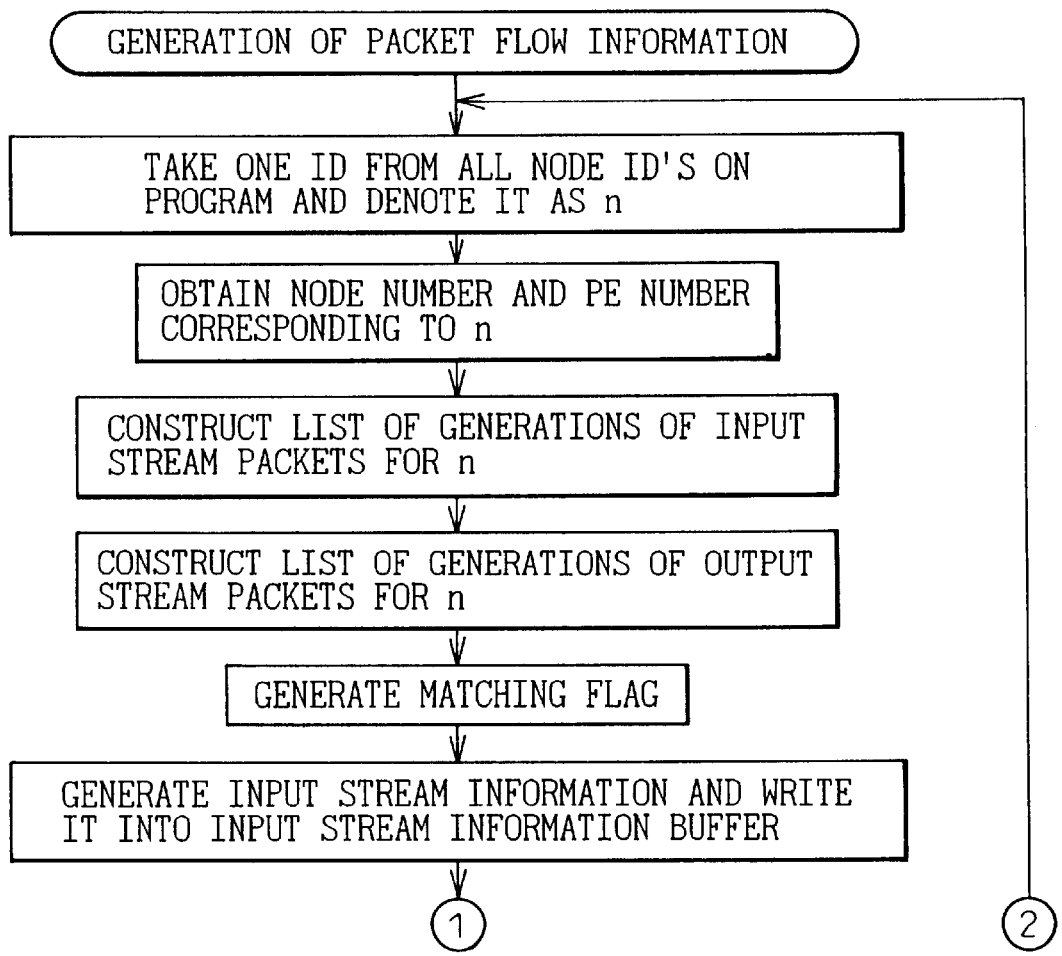
FIGS. 22A and 22B is a flowchart illustrating a procedure for the generation of the packet flow information.
Figure 22B:
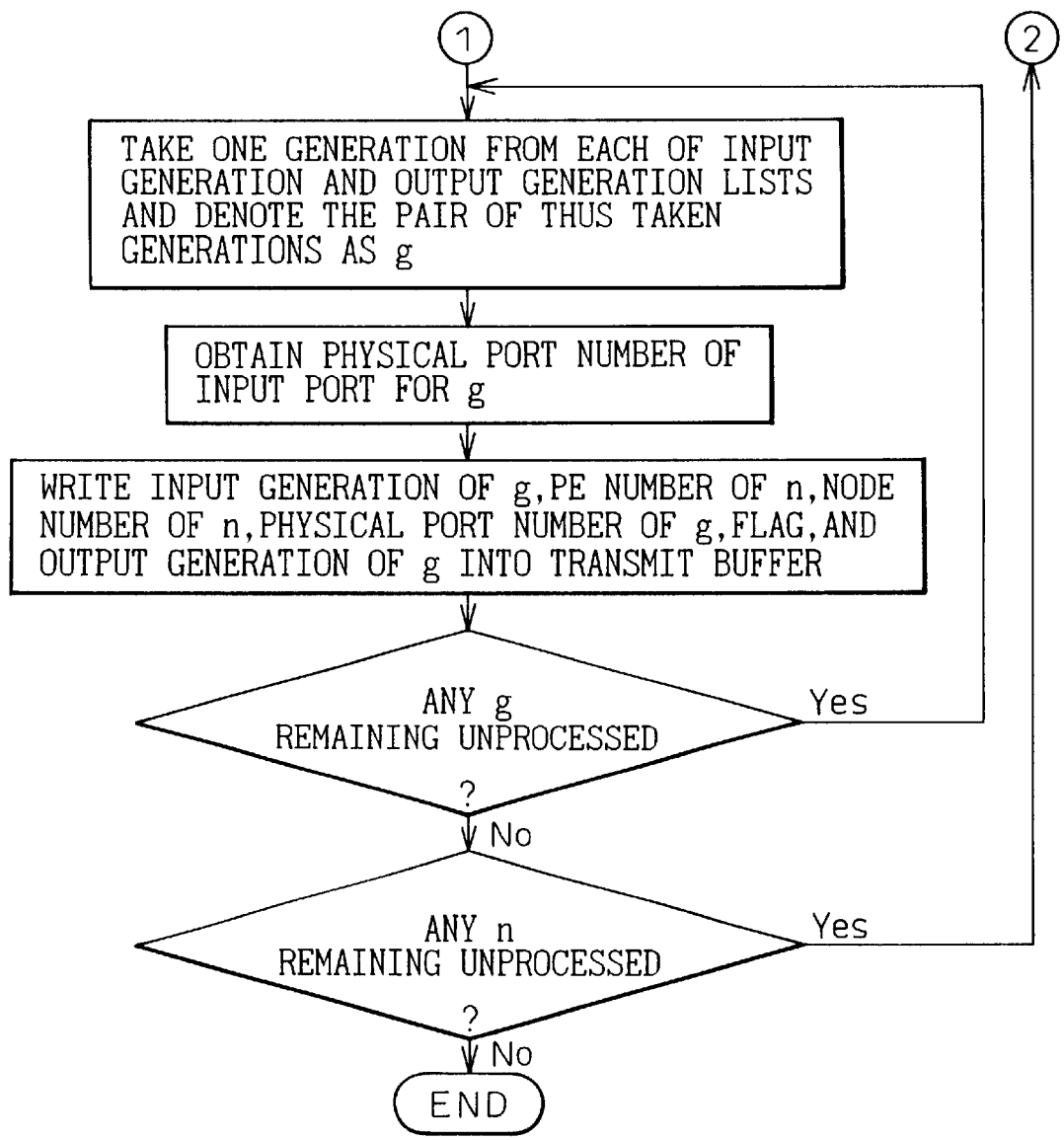

As shown in FIG. 21, the packet flow information consists of: generation; hash key to be used when referring to the matching memory connected to the FC; matching flag indicating whether the packet needs matching or not; op code delay time indicating the processing time for the instruction op code; COPY #; and NEXT IDp. NEXT IDp is the IDp to be assigned next at the PS, and there are as many NEXT IDp's as the number indicated by COPY #. The detailed procedure for the generation of this information is shown in the flowchart of FIGS. 22A and 22B.

Next, in step 440, the input stream information shown in FIG. 23 is generated. The input stream is a stream of virtual packets to be input to the target processor. The data-driven processors that performs the emulation generates virtual packets, each having the specified IDf, timestamp (TS), and IDp, stores them in a virtual buffer in the target system in the order of arrival, and performs the emulation by reading the virtual packets one at a time from the virtual buffer. Here, as the input stream information buffer is already created in the above packet flow information generation process (FIG. 22), it is only necessary in this step to write the contents of the input stream information buffer at the tail of the transmit buffer.

In the final step 450, processing is performed for transmission to the data-driven processors operating as the emulator. More specifically, a connection is established to the emulator, and the contents of the transmit buffer are transmitted.

The emulation information thus transmitted is received by the data-driven processor operating as the emulator, and converted into the prescribed format, as previously described in connection with step 500 in FIG. 14. The emulation program to be described later is divided into the same number of segments as the number of real PEs representing one virtual PE, and stored in the instruction memory (IM) 152 in each of the plurality of PEs 100 in the data-driven processors 100.

Figure 24:
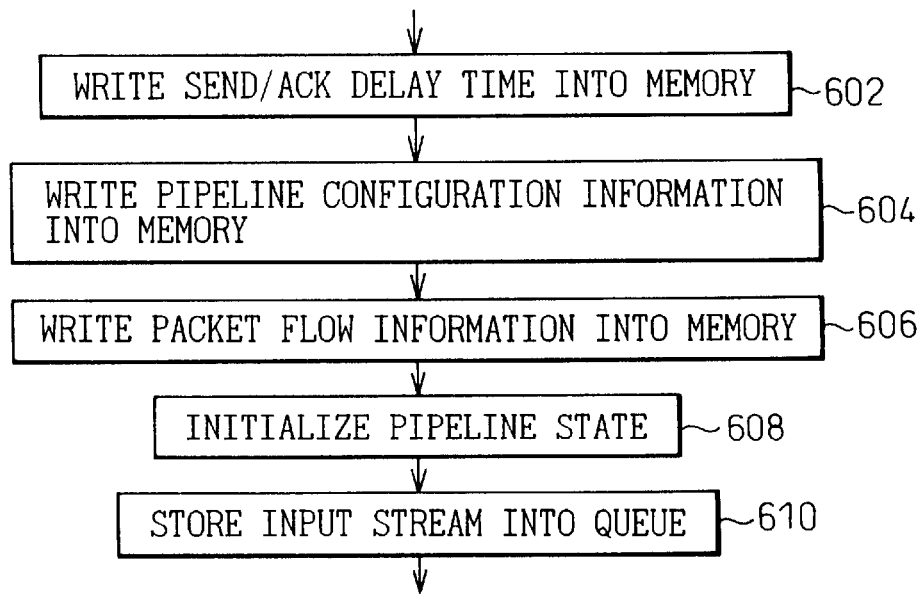
FIG. 24 is a diagram for explaining an initializing operation for an emulator implemented on a real data-driven processor.

Next, in the data-driven processors 100 operating as the emulator, initialization is performed as previously described (step 600 in FIG. 14), the details of which are shown in FIG. 24. First, as shown in steps 602, 604, and 606, the SEND/ACK delay time information (FIG. 17), the pipeline configuration information (FIG. 19), and the packet flow information (FIG. 21) are respectively written into the data memories (DM) 142 in the PEs 100 that perform the respectively corresponding processes.

Next, in step 608, processing is performed to initialize the pipeline state of the virtual processors to be emulated. More specifically, in correspondence with the operation performed in the real data-driven processors to reset all the C elements by the master reset to the initial state, that is, SEND=0 and ACK=1, an ACK message with timestamp 0 is transmitted as the initializing message to all the self-timed transfer control mechanisms (STCMs).

Finally, in step 610, the input stream information (FIG. 23) is stored in a queue provided in the data memory (DM) 142 in one PE 110, thus completing the initialization of the emulator.

Figure 25:
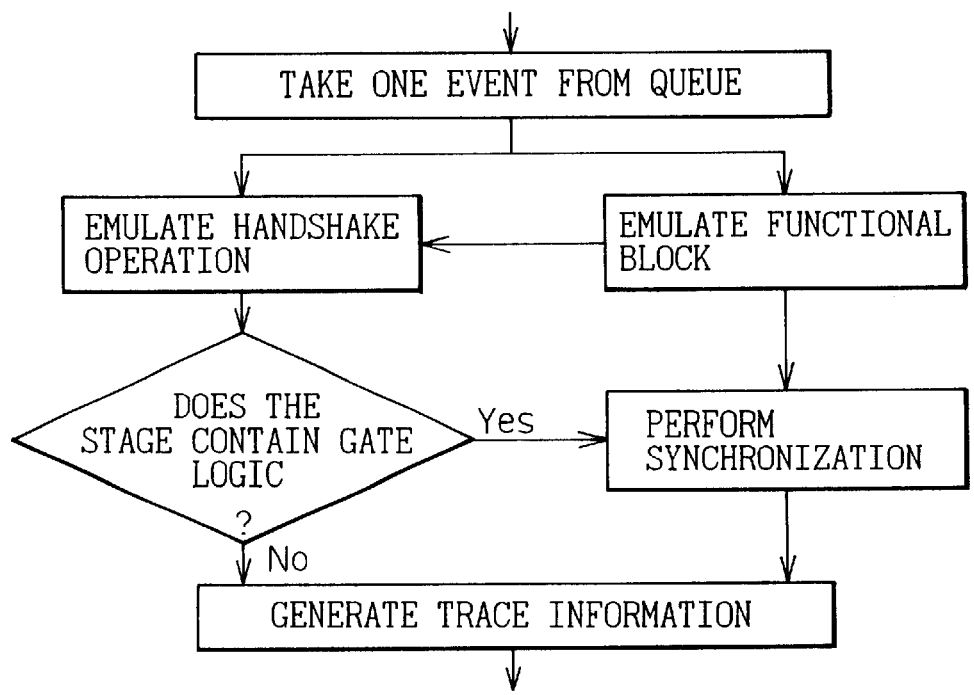
FIG. 25 is a diagram outlining the emulation operation of the emulator.

In the data-driven processors 100 as the emulator, the initialization step is followed by the emulation step (step 700 in FIG. 14), as previously described; an outline of the operation is shown in FIG. 25. That is, one event (input data) is taken from the queue, and the emulation of the previously described handshake operation and the emulation of the functional block are performed in parallel. In the case of the stage containing the gate logic, processing is performed to establish synchronization between these emulations. Then, trace information is generated, to complete the processing for one event. The details of the emulation will be described below.

Figure 26:
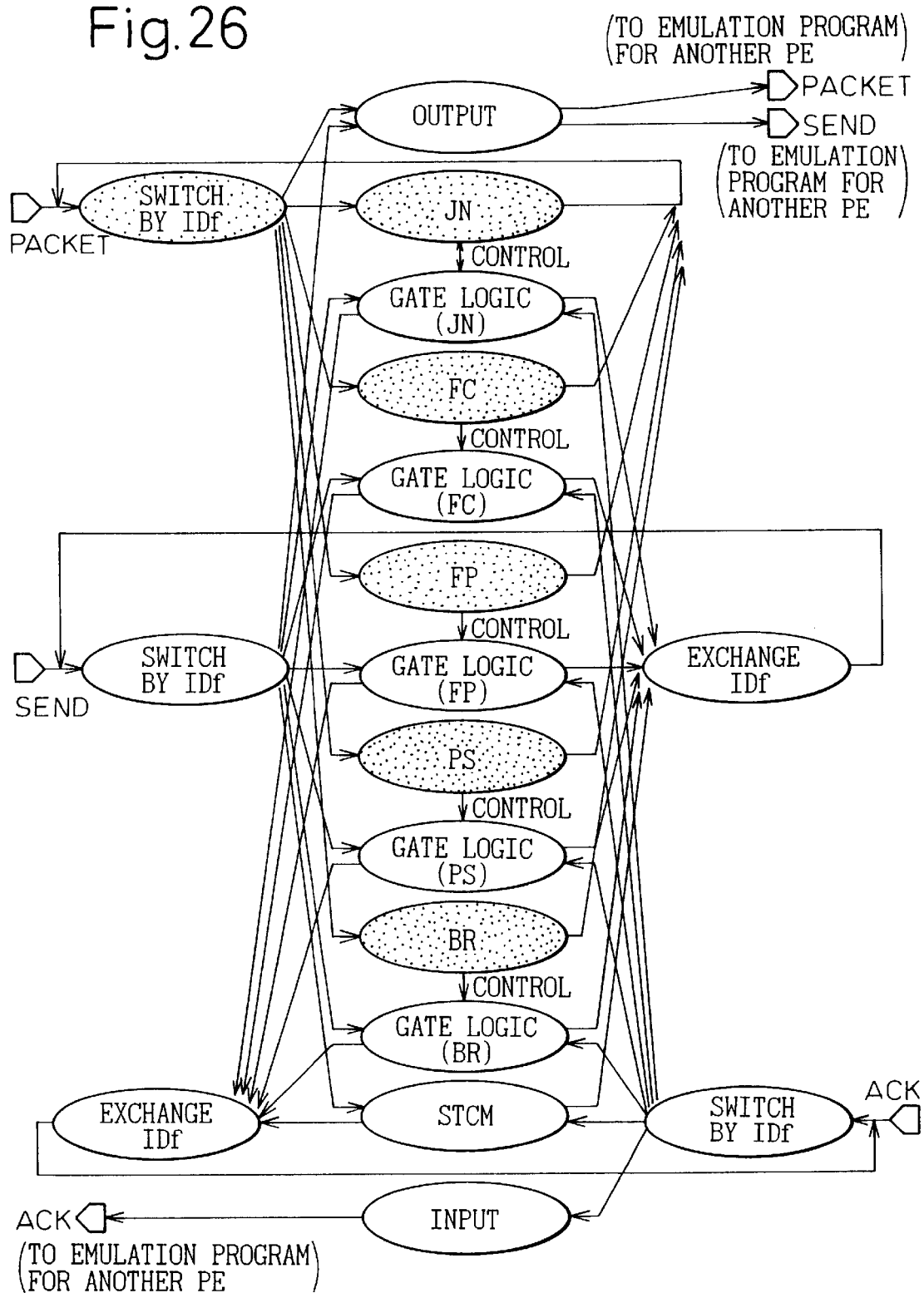
FIG. 26 is a dataflow graph showing the entire structure of an emulation program for one PE.

FIG. 26 is a dataflow graph showing the entire structure of the emulation program for one PE. That is, the figure shows the uppermost layer of one PE emulation, and illustrates how each message is dispatched to an appropriate module. Each message carries IDf as information indicating the destination module. Therefore, by switching each message based on its IDf (SWITCH BY IDf in the figure), the message is transmitted to the appropriate module.

As soon as the necessary messages arrive, each module starts its evaluation, and issues the messages to the downstream module. At this time, by referring to the pipeline configuration information, IDf is set as the identifier of the destination module (EXCHANGE IDf in the figure). When one PACKET message is entered into the program, one SEND message is also entered into the program at the same time. The configuration of each individual module will be described below.

Figure 27:
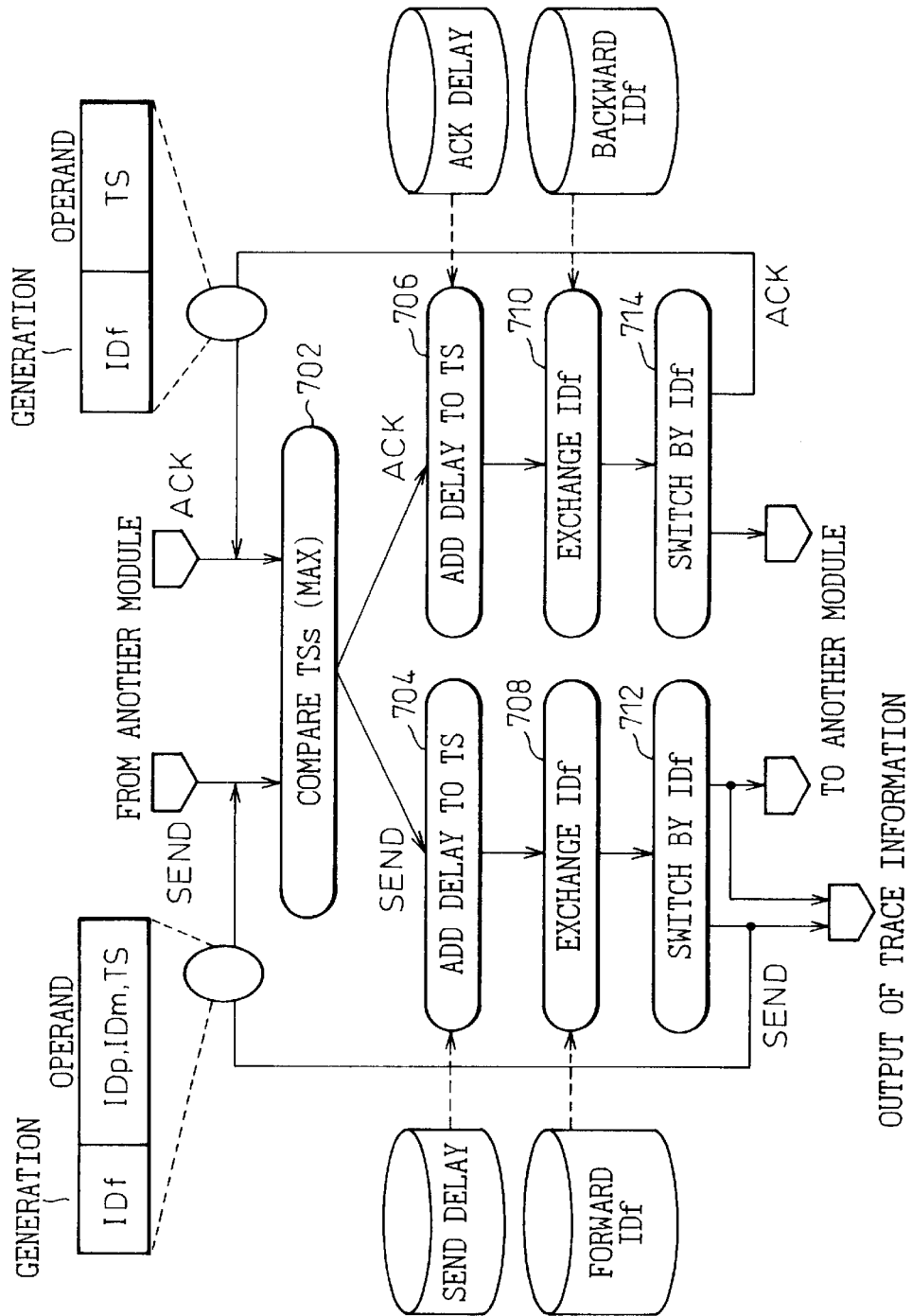
FIG. 27 is a dataflow graph schematically showing an STCM (Self-timed Transfer Control Mechanism) emulation module.

FIG. 27 is a dataflow graph schematically showing the STCM (Self-timed Transfer Control Mechanism) emulation module. That is, this module emulates the self-timed transfer control mechanism 230 shown in FIG. 9; a more specific implementation of the dataflow graph of FIG. 11 is shown here. The operation of the self-timed transfer control mechanism becomes ready for evaluation when both the SEND message from the upstream self-timed transfer control mechanism and the ACK message from the downstream self-timed transfer control mechanism are received.

First, the timestamp of the SEND message is compared with the timestamp of the ACK message, and the larger timestamp is taken as representing the handshake completion date/time (node 702). Then, by referring to the SEND/ACK delay time information (FIG. 17), the SEND delay time associated with the corresponding IDf is obtained, and the value obtained by adding the delay time to the handshake completion date/time is taken as the new timestamp of the SEND message (node 704). Likewise, the ACK delay time associated with the corresponding IDf is added to the handshake completion date/time, and the resulting value is taken as the new timestamp of the ACK message (node 706).

Then, by referring to the pipeline configuration information (FIG. 19), the forward IDf associated with the corresponding IDf is set as the new IDf of the SEND message, while the backward IDf associated with the corresponding IDf is set as the new IDf of the ACK message (nodes 708 and 710). The SEND message and the ACK message are each transferred to the next module based on the value of the new IDf (nodes 712 and 714). Here, if the IDf is one relating to any one of the self-timed transfer control mechanisms within the same PE, the flow loops back to the module shown here.

Figure 28:
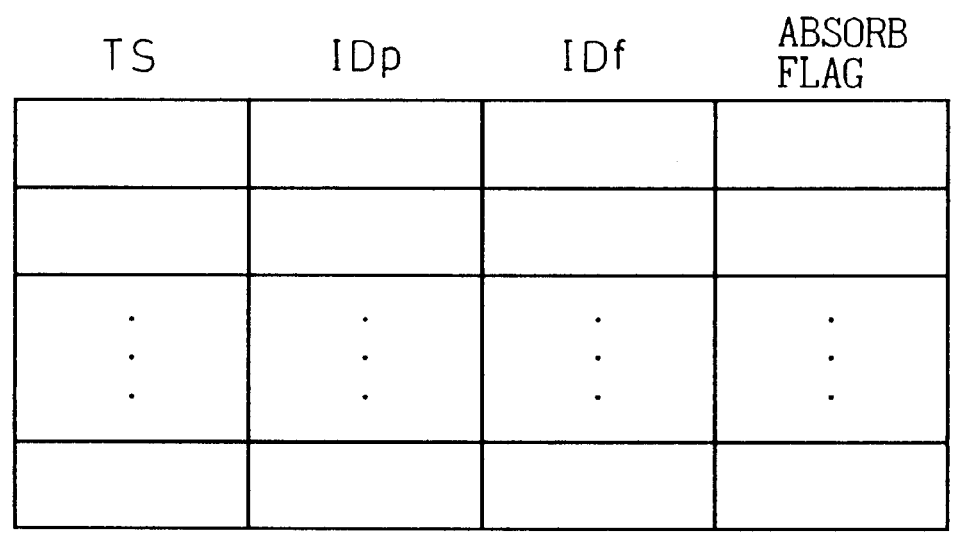

When the SEND message is one to be sent to the next destination module, its trace information is added in the output stream information shown in FIG. 28. The output stream information is transmitted as necessary to the PC 300 as the information concerning the packet position and date/time. The trace information is recorded not only when the handshake using SEND and ACK is established in the self-timed transfer control mechanism, as described above, but also when the packet is stored in the matching memory in the FC emulation module, or when the packet is erased in the PS emulation module, as will be described later.

According to the output stream shown in FIG. 28, it is shown that, at the date/time indicated by the timestamp, the packet identified by IDp arrived or was discarded at the module identified by IDf. Absorb flag is set to 1 only when the packet is discarded at the FC or the PS.

Figure 29:
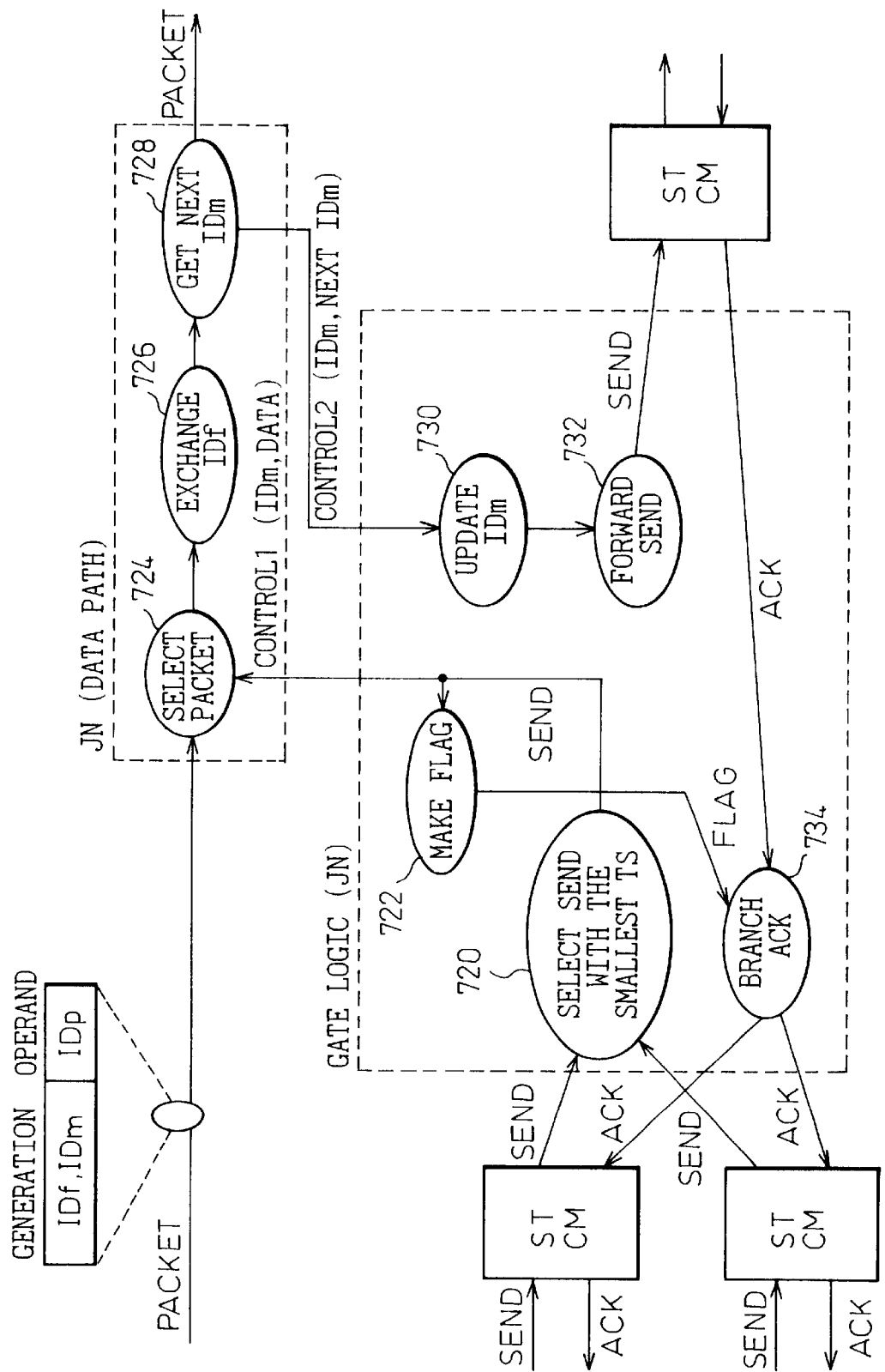
FIG. 29 is a dataflow graph schematically showing a JN (Joint) emulation module.

FIG. 29 is a dataflow graph schematically showing the JN (Joint) emulation module. That is, this module emulates the JN (Joint) 120 shown in FIG. 1. Of the virtual packets merging there, the joint transfers the virtual packet having the smallest timestamp to the downstream module. As the operation of the joint depends on the timestamp of each virtual packet, the gate logic in the pipeline emulation determines the behavior of the packet.

As shown in FIG. 29, when the SEND messages are received from all the upstream modules, the gate logic selects the SEND message with the smallest timestamp (node 720). Then, a flag indicating the originating module of that SEND message is generated (node 722). This flag is used to determine the destination of the ACK message. At the same time, synchronization is established with the PACKET message in the functional block emulation (node 724). This synchronization can be easily accomplished as real packet matching in the FC by using the previously described IDm as the generation.

In the functional block emulation, the IDf of the functional block to which the PACKET message is to be transferred next is acquired (node 726), and an inquiry is sent to the destination functional block for new IDm (node 728). The destination functional block returns a value to the inquiring functional block by adding 1 to the last given IDm. When the new IDm is acquired, the PACKET message is sent to the next functional block, and the IDm to the gate logic (node 728). The gate logic updates the IDm (node 730), and transmits the SEND message to the downstream module (node 732). On the other hand, when the ACK message is received, the ACK message is transmitted to the originating module of the last selected SEND message, that is, the module indicated by the flag (node 734).

Figure 30:
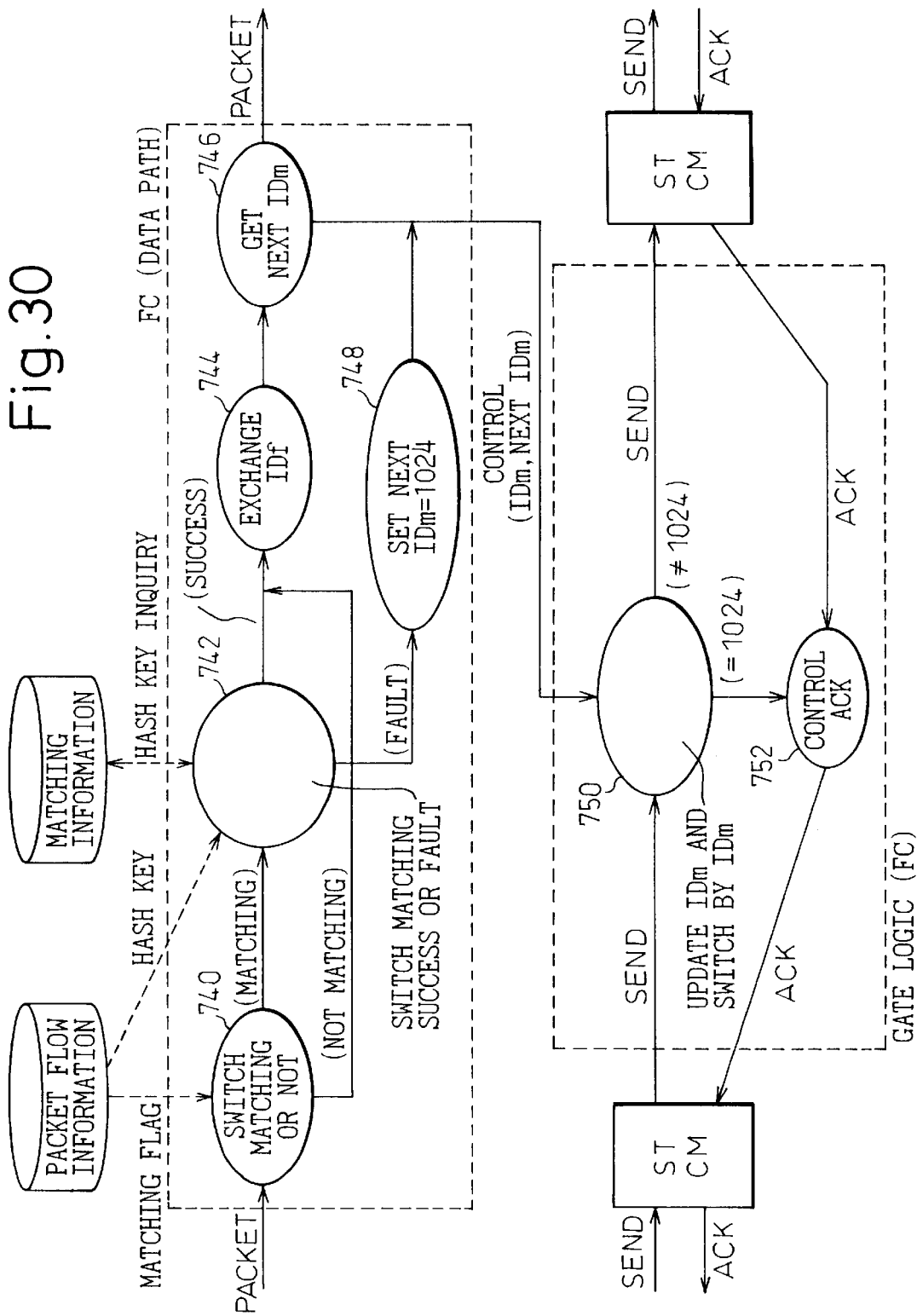
FIG. 30 is a dataflow graph schematically showing an FC (Firing Control) emulation module.

FIG. 30 is a dataflow graph schematically showing the FC (Firing Control) emulation module. That is, this module emulates the Firing Control 130 shown in FIG. 1. In the functional block emulation of the FC, first at node 740, by referring to the packet flow information (FIG. 21) based on the IDp of the PACKET message, it is determined whether the corresponding matching flag is 1 or not and, if the flag is 1, indicating that the packet needs matching, the PACKET message is sent to node 742; on the other hand, if the flag is 0, indicating that the matching is not needed, the PACKET message is sent to node 744.

At node 742, it is determined whether the matching has been made successfully or not, by checking whether the number of accesses made using the hash key to refer to the matching memory is an odd number or an even number; when the matching has been made successfully, a branch is made to node 744, but when the matching has failed, a branch is made to node 748. The nodes 744 and 746 are the same as the nodes 726 and 728 in the above-described JN emulation module. At the node 748 which is carried out when the matching has failed, the value of 1024 is set in NEXT IDm to indicate that the packet did not fire but was discarded by being stored in the matching memory. As earlier noted, when the packet is stored in the matching memory, its trace information (FIG. 28) is recorded.

In the gate logic emulation of the FC, at node 750, when the SEND message is received, the CONTROL message having its IDm as the generation is selected and the IDm is updated; when the updated IDm indicates "fired", the SEND message is transmitted to the downstream module, but when it indicates "unfired" meaning that the PACKET message was discarded, a branch is made to node 752. At node 752, the ACK message is transmitted to the upstream module not only when the ACK message is received, but also when a branch is made from node 750. This is because ACK must be returned, from the module, because PACKET and SEND are not set to the downstream module.

Figure 31:
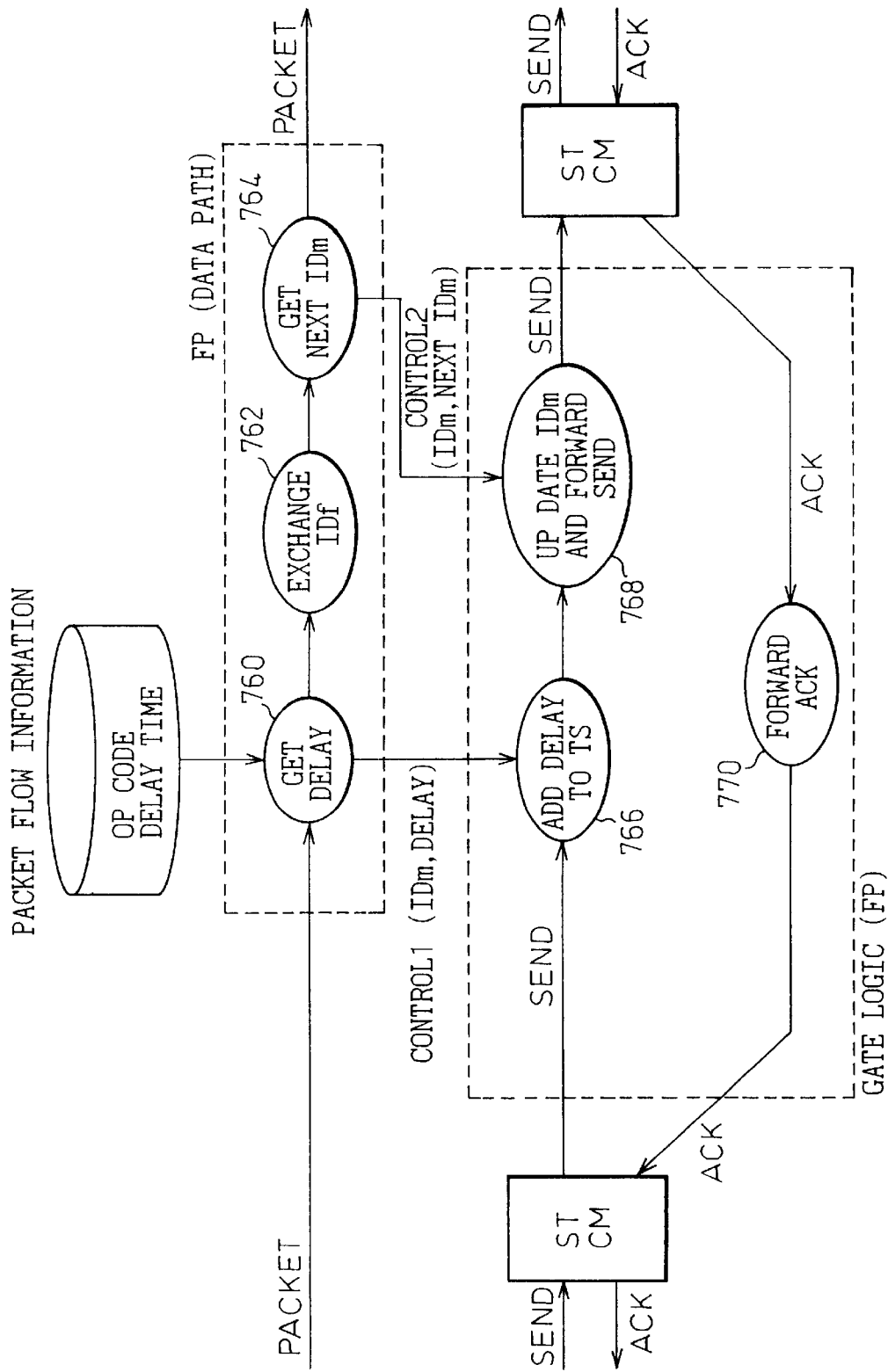
FIG. 31 is a dataflow graph schematically showing an FP (Functional Processor) emulation module.

FIG. 31 is a dataflow graph schematically showing the FP (Functional Processor) emulation module. That is, this module emulates the Functional Processor (FP) 140 shown in FIG. 1. In the FP, the instruction execution time varies depending on the instruction, as the number of memory accesses, etc. vary. Accordingly, in the FP, an appropriate instruction execution time must be added to the timestamp according to the op code. The emulation shown here is intended to emulate the packet flow at the pipeline stage level; as the behavior of the packet is obtained before performing the emulation, the operation specified by the op code is not performed on the operands when performing the emulation.

As shown in FIG. 31, in the functional block emulation, the instruction execution time (op code delay time) corresponding to the op code is acquired by referring to the packet flow information (FIG. 21) based on IDp, and is reported in the form of a CONTROL 1 message to the gate logic (node 760). Next, IDf and IDm are updated, and the PACKET message is transmitted to the downstream functional block, while at the same time, NEXT IDm is reported in the form of a CONTROL 2 message to the gate logic (nodes 762 and 764).

At the gate logic, when the SEND message is received, the corresponding CONTROL 1 message is selected, and the instruction execution time is added to the timestamp (node 766). Next, DIm is updated in accordance with the CONTROL 2 message, and the SEND message is transmitted to the downstream module (node 768). When the ACK message is received, the ACK message is transmitted to the upstream pipeline stage (node 770).

Figure 32:
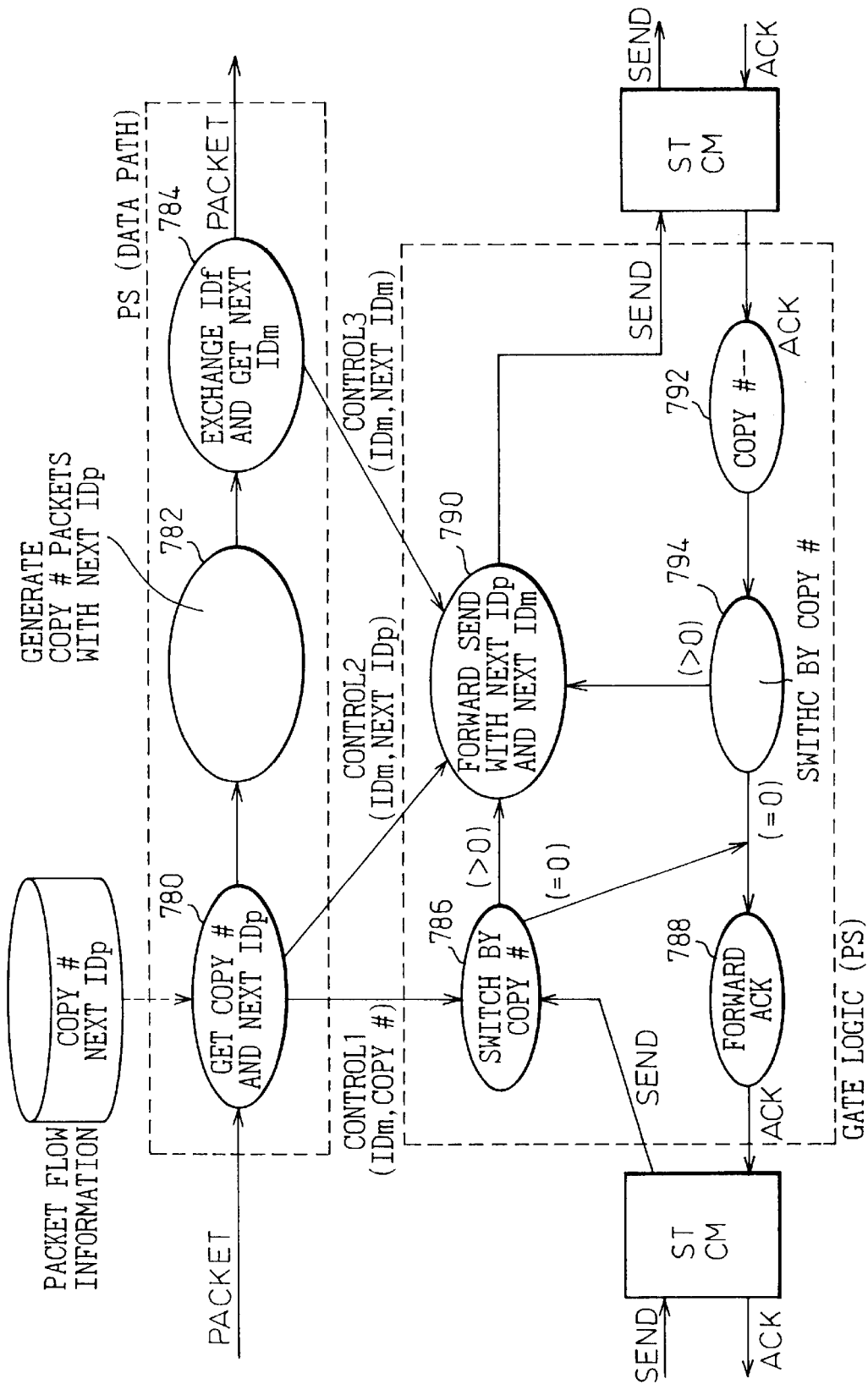
FIG. 32 is a dataflow graph schematically showing a PS (Program Storage) emulation module.

FIG. 32 is a dataflow graph schematically showing the PS (Program Storage) emulation module. That is, this module emulates the Program Storage (PS) 150 shown in FIG. 1. In the real PS, the next destination and the op code are fetched, and at the same time, the copying and the erasure of the packet are performed. In the emulation, as the destination and the op code are acquired in the form of the packet flow information before performing the emulation, it is only necessary to perform the packet copying and erasure and the updating of IDp.

In the functional block emulation, by referring to the packet flow information (FIG. 21) based on the IDp of the PACKET message, the corresponding COPY # and the same number of NEXT IDp's (IDp's to be newly assigned) as the number specified by the COPY # are acquired, and these are transmitted in the form of the CONTROL 1 and CONTROL 2 messages to the gate logic (node 780). Next, as many PACKET messages as indicated by the number specified by the COPY # are generated (node 782). If the value of the COPY # is 0, no PACKET message is generated.

Finally, the IDf and IDm of each PACKET message are updated, and the PACKET message is transmitted to the downstream functional block; at the same time, the updated IDm is transmitted in the form of a CONTROL 3 message to the gate logic (node 784). As earlier noted, when the packet is erased, its trace information (FIG. 28) is recorded.

At the gate logic, when the SEND message is received, the corresponding CONTROL 1 message is selected based on the IDm. If the COPY # carried in the selected CONTROL 1 message is 0 meaning that the packet was erased, the SEND message is discarded, and the ACK message is transmitted to the upstream module (nodes 786 and 788).

If the COPY # is 1 or larger, a SEND message is generated and transmitted to the downstream module (node 790). Thereafter, the process of generating the SEND message and transmitting it to the downstream pipeline stage is repeated each time the ACK message is received, until the number of SEND messages generated reaches the number specified by the COPY # (nodes 792, 794, and 790). When the number of SEND messages generated has reached the number specified by the COPY #, the ACK message received is transmitted to the upstream pipeline stage (nodes 794 and 788).

Figure 33:
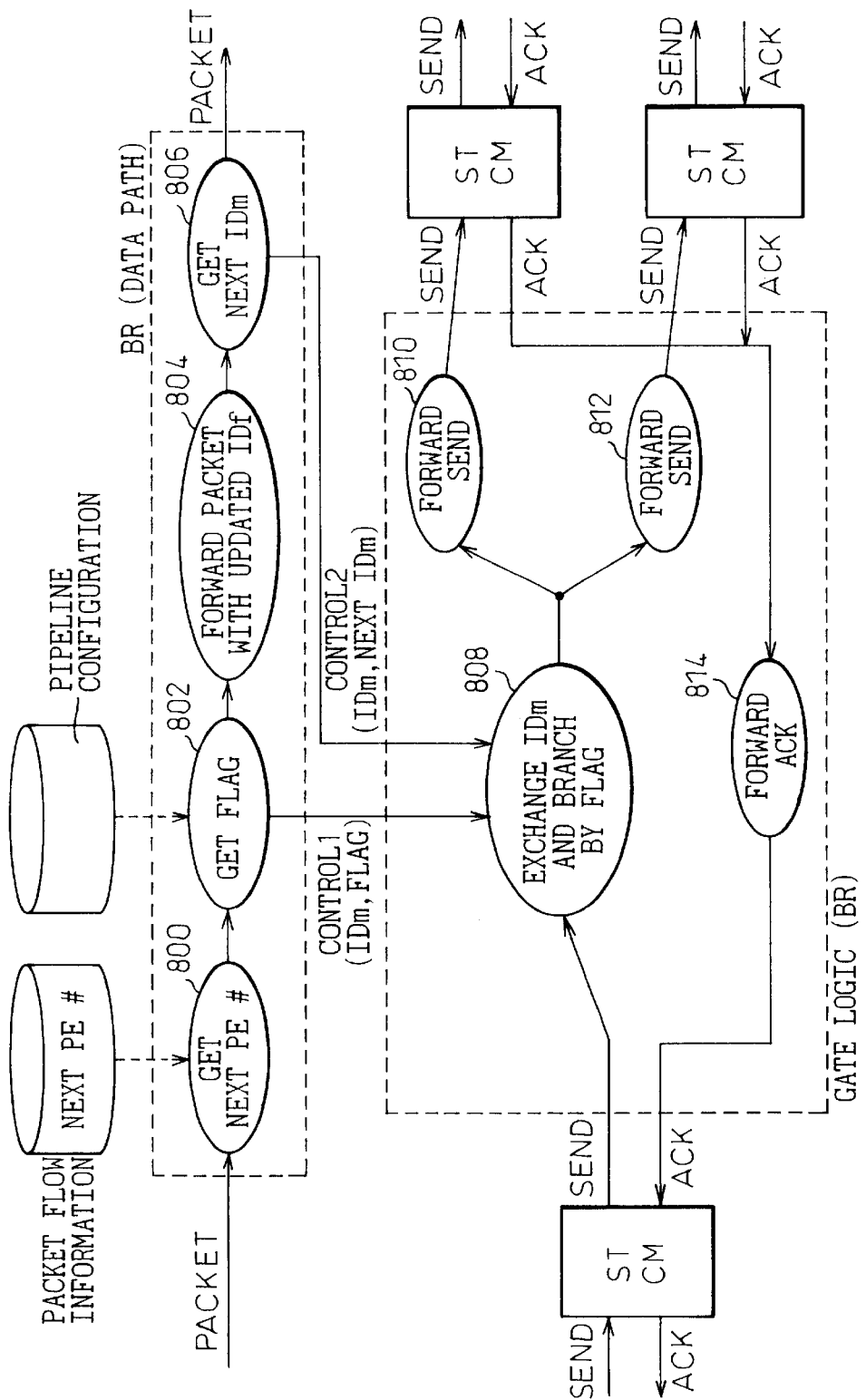
FIG. 33 is a dataflow graph schematically showing a BR (Branch) emulation module.

FIG. 33 is a dataflow graph schematically showing the BR (Branch) emulation module. That is, this module emulates the Branch 160 shown in FIG. 1. In the functional block emulation, by referring to the pipeline configuration information (FIG. 19) and the destination PE # contained in the packet flow information (FIG. 21), a flag (FLAG) indicating the module to which the packet is to be transmitted is acquired (nodes 800 and 802).

The flag is reported in the form of the CONTROL 1 message to the gate logic and, at the same time, the IDf of the packet is updated in accordance with the flag (node 804). By thus updating the IDf, the PACKET message is transferred to the appropriate module in the layer of FIG. 26. Next, IDm is updated and transmitted in the form of the CONTROL 2 message to the gate logic, and at the same time, the PACKET message is transmitted to the next functional module (node 806).

At the gate logic, when the SEND message is received, its IDm is updated to the new IDm (NEXT IDm) indicated by the CONTROL 2 message, and a branch is made in accordance with the destination module identifying flag carried in the CONTROL 1 message (node 808). Next, the SEND message is transmitted to the destination module indicated by the flag (nodes 810 and 812). When the ACK message is received, the gate logic transmits the ACK message to the upstream module (node 814).

When all the input streams have been input to the module, and the SEND/PACKET messages have all been transmitted out, the emulation is terminated. Then, after the trace information (FIG. 28) recorded during the emulation process has all been transmitted to the PC 300 (step 900 in FIG. 14), as previously described, the PC 300 displays the result of the emulation on the display (step 1000 in FIG. 14).

Figure 34:
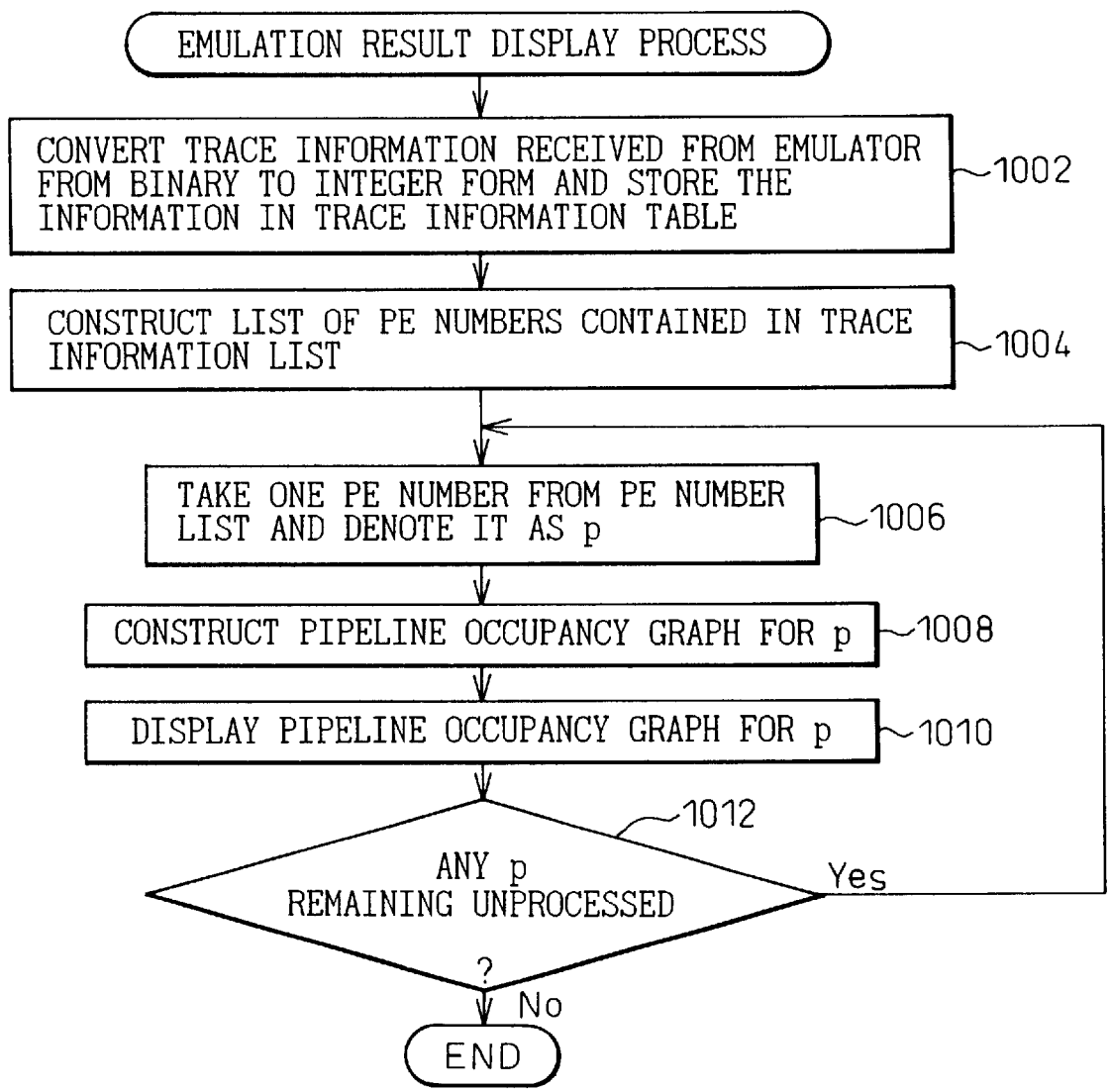
FIG. 34 is a flowchart illustrating a procedure for the emulation result display process performed in the PC.

FIG. 34 is a flowchart illustrating a procedure for the emulation result display process (step 1000 in FIG. 14) performed in the PC 300. First, in step 1002, the information received from the emulator is converted to integer form and stored in a prescribed trace information table. Then, in step 1004, a list of PE numbers contained in the trace information table is constructed. Next, in step 1006, one PE number is taken from the PE number list, and this PE number is denoted as p.

Figure 35A:
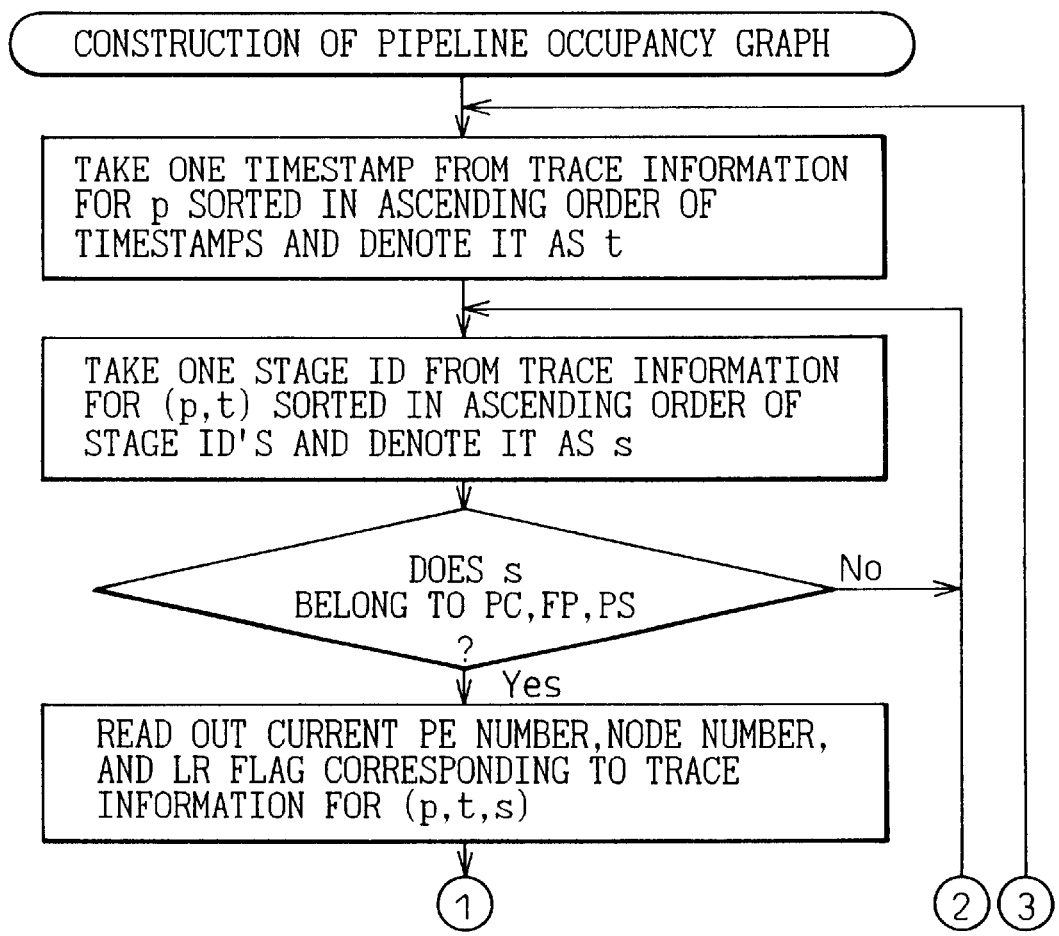

Next, in step 1008, a pipeline occupancy graph for p is constructed. The detailed procedure is shown in FIGS. 35A and 35B. As shown, of all the stages of p, the number of stages where packets are present is counted for each timestamp, and the pipeline occupancy rate is recorded.

Figure 36:
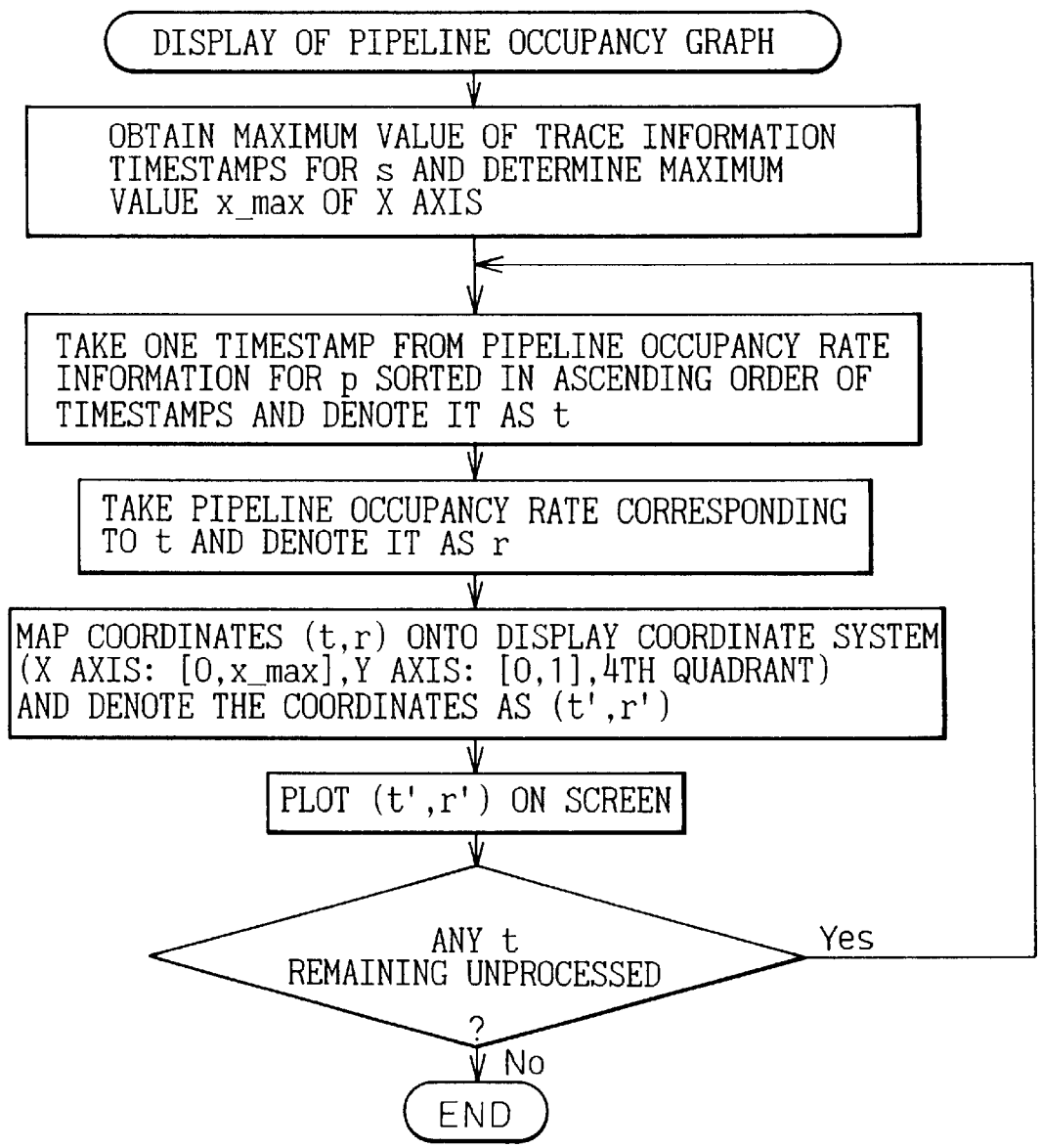
FIG. 36 is a flowchart illustrating a procedure for displaying the pipeline occupancy graph.

Next, in step 1010, processing is performed to display the pipeline occupancy graph for p. The detailed procedure is shown in FIG. 36. An example of the graph thus displayed is shown in FIG. 37. Thus, based on the emulation result displayed on the display of the PC, the user can evaluate the performance of the targeted data-driven processors when the processors execute the target program.

As described above, according to the present invention, there is provided an emulation system for data-driven processors, which aims at shortening the emulation time by employing an emulation technique that can achieve parallel processing without increasing overhead.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data-driven processor emulation system which, using real data-driven processors, emulates virtual data-driven processors each organized as a pipeline consisting of a sequence of stages, each stage having a data latch for holding a packet, a logic circuit for processing the packet held in said data latch, a self-timed transfer control mechanism for supplying a synchronizing signal to said data latch, and an optional gate logic for controlling, based on processing results from said logic circuit, a SEND signal and an ACK signal transferred between said self-timed transfer control mechanism in said stage and a self-timed transfer control mechanism in a downstream stage, wherein each of said real data-driven processors comprises:

data path emulation means for expressing a virtual packet, to be processed in said virtual data-driven processors, as a PACKET message which is a packet to be processed in said real data-driven processor, and for evaluating processing operation of said virtual packet for each functional block within said virtual data-driven processors; and timing path emulation means for expressing said SEND signal and said ACK signal, to be controlled by said self-timed transfer control mechanism and said gate logic, as a SEND message and an ACK message, respectively, which are packets to be processed in said real data-driven processor, and for evaluating stage-to-stage transfer operations of said SEND signal and said ACK signal.

2. A data-driven processor emulation system as claimed in claim 1, wherein said timing path emulation means evaluates the position of said virtual packet at a given time by appending a timestamp to each of said SEND message and said ACK message.

3. A data-driven processor emulation system as claimed in claim 1, wherein said timing path emulation means evaluates control operation of said SEND signal and said ACK signal at said gate logic by receiving a CONTROL message representing the result of the evaluation from said data path emulation means.

4. A data-driven processor emulation system as claimed in claim 1, wherein said data path emulation means processes a plurality of PACKET messages in parallel by assigning a unique identifier to each virtual packet.

5. A data-driven processor emulation system as claimed in claim 1, wherein said timing path emulation means processes said SEND message and said ACK message in parallel by assigning a unique identifier on a stage-by-stage basis.

6. A data-driven processor emulation system as claimed in claim 1, further comprising a von Neumann computer which is connected to said real data-driven processor via a computer network, and which performs processing for generating emulation information and displaying the result of the emulation.

7. A data-driven processor emulation system as claimed in claim 6, wherein said von Neumann computer creates in advance packet flow information in which information concerning each individual virtual packet is described, and said data path emulation means determines the behavior of said virtual packet by referring to said packet flow information.

8. A data-driven processor emulation system as claimed in claim 6, wherein said von Neumann computer receives, from said real data-driven processor, trace information concerning the position and time of each virtual packet, and displays a pipeline occupancy graph plotting the ratio of the number of stages where packets are present to the total number of stages as a function of time.

* * * * *